US012568240B2

(12) United States Patent
Chen et al.

(10) Patent No.: US 12,568,240 B2
(45) Date of Patent: Mar. 3, 2026

(54) IBC MERGE MODE WITH A BLOCK VECTOR DIFFERENCE

(71) Applicant: Tencent America LLC, Palo Alto, CA (US)

(72) Inventors: Lien-Fei Chen, Hsinchu (TW); Roman Chernyak, Palo Alto, CA (US); Xiaozhong Xu, State College, PA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 108 days.

(21) Appl. No.: 18/409,445

(22) Filed: Jan. 10, 2024

(65) Prior Publication Data

US 2024/0236351 A1      Jul. 11, 2024

Related U.S. Application Data

(60) Provisional application No. 63/438,490, filed on Jan. 11, 2023.

(51) Int. Cl.
| | |
|---|---|
| *H04N 19/105* | (2014.01) |
| *H04N 19/137* | (2014.01) |
| *H04N 19/176* | (2014.01) |
| *H04N 19/44* | (2014.01) |

(52) U.S. Cl.
CPC ........... *H04N 19/44* (2014.11); *H04N 19/105* (2014.11); *H04N 19/137* (2014.11); *H04N 19/176* (2014.11)

(58) Field of Classification Search
CPC ..... H04N 19/52; H04N 19/593; H04N 19/105
See application file for complete search history.

(56) References Cited

U.S. PATENT DOCUMENTS

| | | | | |
|---|---|---|---|---|
| 10,469,863 B2 * | 11/2019 | Zhu | ........................ | H04N 19/52 |
| 10,666,968 B2 * | 5/2020 | Xu | ........................ | H04N 19/52 |
| 11,025,917 B2 * | 6/2021 | Xu | ........................ | H04N 19/115 |
| 11,838,542 B2 * | 12/2023 | Kim | ..................... | H04N 19/174 |

(Continued)

OTHER PUBLICATIONS

Block vector prediction in Intra block copy for HEVC screen content coding; Xu; 2015; (Year: 2015).*

(Continued)

*Primary Examiner* — Luis Perez-Fuentes
(74) *Attorney, Agent, or Firm* — ArentFox Schiff LLP

(57) ABSTRACT

Aspects of the disclosure include methods and an apparatus for video coding. The apparatus includes processing circuitry that receives coded information of a current block in a current picture. The current block is predicted based on a reference block in the current picture indicated by a block vector (BV) to be determined based on a BV predictor (BVP) and a BV difference (BVD). The processing circuitry determines a BVD list including BVD candidates based at least on BVD offsets from the BVP, determines the BVD from the BVD candidates in the BVD list, and reconstructs the current block using the BVD. For each adjacent pair of the BVD offsets, an initial interval size indicates a difference between the adjacent pair of the BVD offsets. Each of the initial interval sizes is different from other initial interval sizes corresponding to other adjacent pairs of the BVD offsets.

20 Claims, 13 Drawing Sheets

(56) References Cited

U.S. PATENT DOCUMENTS

| | | | | |
|---|---|---|---|---|
| 12,113,986 B2 * | 10/2024 | Xu | ........................ | H04N 19/52 |
| 12,113,998 B2 * | 10/2024 | Bae | ..................... | H04N 19/463 |
| 2015/0373366 A1 * | 12/2015 | He | ...................... | H04N 19/463 |
| | | | | 375/240.16 |
| 2019/0281303 A1 | 9/2019 | Xu et al. | | |
| 2022/0182604 A1 | 6/2022 | Kim et al. | | |

OTHER PUBLICATIONS

On the displacement vector prediction scheme for intra block copy; Onno; 2014; (Year: 2014).*

IBC MBVD list derivation; Zhang—Jan. 2023; (Year: 2023).*

Zhi Zhang, et al., "Non-EE2: IBC MBVD list derivation", Joint Video Experts Team (JVET) of ITU-T SG 16 WP 3 and ISO/IEC JTC 1/SC 29, 29th Meeting, by teleconference, Jan. 11-20, 2023, Document: JVET-AC0159-v1, pp. 1-3.

International Search Report and Written Opinion received for PCT Patent Application No. PCT/US2024/011190, mailed on Apr. 17, 2024, 8 pages.

* cited by examiner

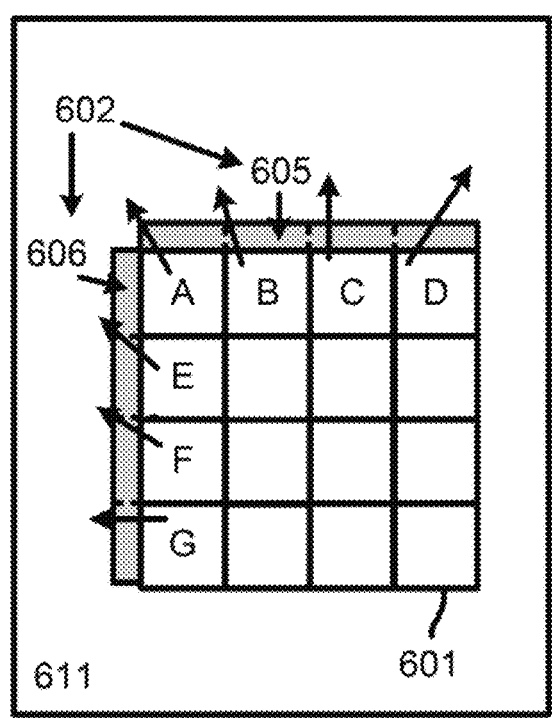
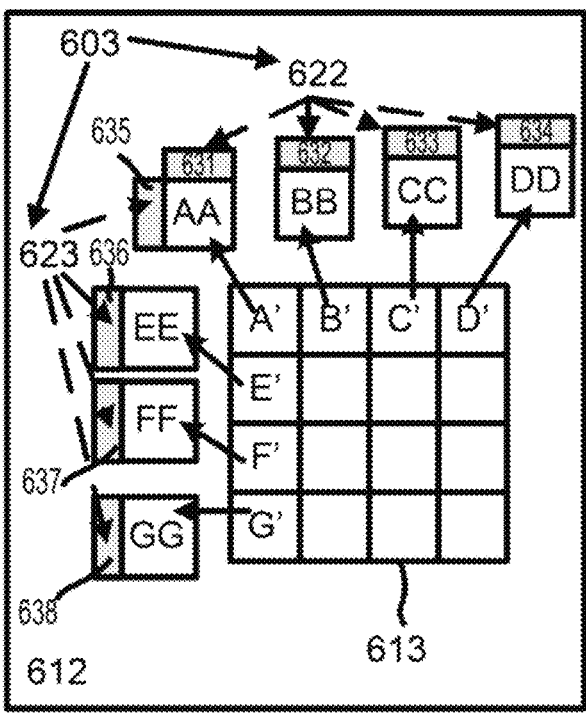
FIG. 6
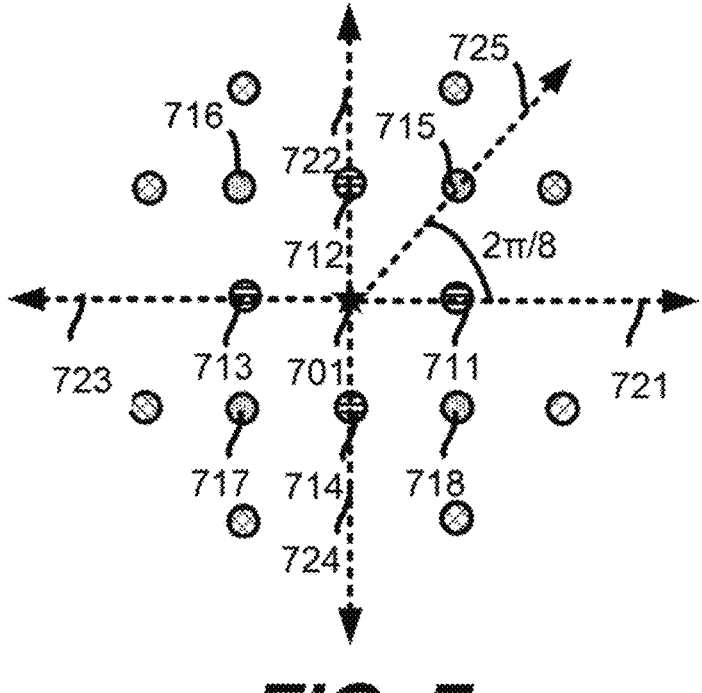
FIG. 7

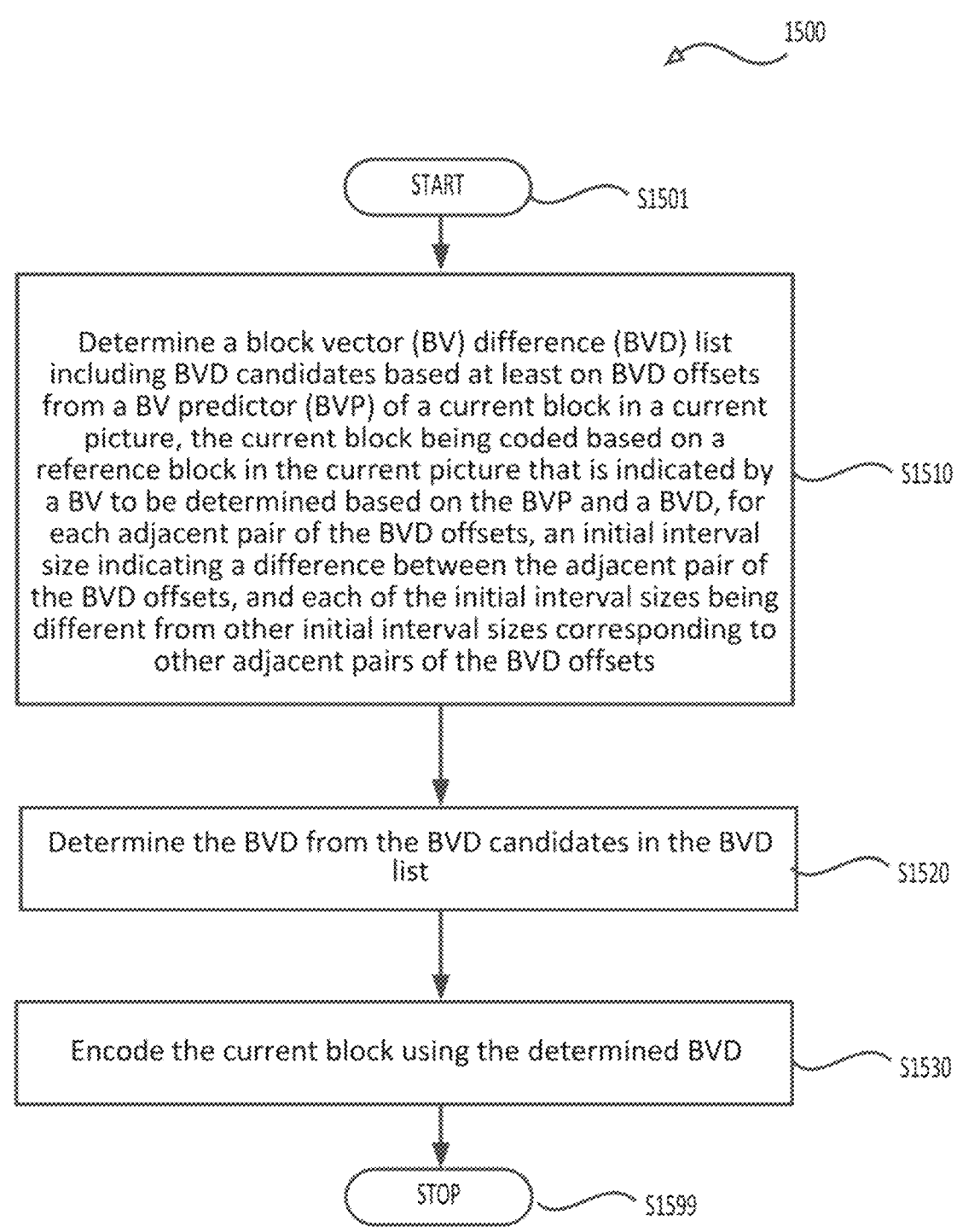

1500

START —— S1501

Determine a block vector (BV) difference (BVD) list
including BVD candidates based at least on BVD offsets
from a BV predictor (BVP) of a current block in a current
picture, the current block being coded based on a
reference block in the current picture that is indicated by
a BV to be determined based on the BVP and a BVD, for
each adjacent pair of the BVD offsets, an initial interval
size indicating a difference between the adjacent pair of
the BVD offsets, and each of the initial interval sizes being
different from other initial interval sizes corresponding to
other adjacent pairs of the BVD offsets —— S1510

Determine the BVD from the BVD candidates in the BVD
list —— S1520

Encode the current block using the determined BVD —— S1530

STOP —— S1599

*FIG. 15*

IBC MERGE MODE WITH A BLOCK VECTOR DIFFERENCE

INCORPORATION BY REFERENCE

The present application claims the benefit of priority to U.S. Provisional Application No. 63/438,490, "IBC Merge Mode with BV Difference" filed on Jan. 11, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a coded video bitstream comprising coded information of a current block in a current picture. The current block can be predicted based on a reference block in the current picture that is indicated by a block vector (BV) to be determined based on a BV predictor (BVP) and a BV difference (BVD) that is a difference between the BV and the BVP. The processing circuitry determines a BVD list including BVD candidates based at least on BVD offsets from the BVP. The processing circuitry determines the BVD from the BVD candidates in the BVD list and reconstructs the current block using the determined BVD. For each adjacent pair of the BVD offsets, an initial interval size indicates a difference between the adjacent pair of the BVD offsets, and each of the initial interval sizes is different from other initial interval sizes corresponding to other adjacent pairs of the BVD offsets.

In an example, the initial interval sizes are arranged in an ascending order.

The initial interval sizes can be powers of 2.

In an example, the initial interval sizes include K sizes, each of the initial interval sizes is $2^{i-1}$, i is an integer in an range from 1 to K, and K is larger than 1.

In an example, the initial interval sizes are stored in a look-up table.

In an example, one of the initial interval sizes is not a power of 2.

In an aspect, the processing circuitry determines initial BVD candidates based on (i) the BVD offsets and (ii) BVD directions. Each of the initial BVD candidates has one of the BVD offsets and a corresponding one of the BVD directions. The processing circuitry determines a template-matching (TM) cost associated with each initial BVD candidate in the initial BVD candidates between a current template of the current block and a respective reference template of a candidate reference block. The candidate reference block is indicated by an initial BV candidate that is a sum of the BVP and the respective initial BVD candidate. The processing circuitry determines the BVD list based on the TM costs.

In an example, the processing circuitry selects K initial BVD candidates from the initial BVD candidates as the BVD candidates in the BVD list. The K initial BVD candidates correspond to lowest TM costs in the TM costs.

In an example, the processing circuitry selects K initial BVD candidates from the initial BVD candidates. The K initial BVD candidates correspond to lowest TM costs in the TM costs. For each of the K initial BVD candidates that has a respective BVD offset and a BVD direction, when the BVD offset is the only BVD offset that is larger than a first BVD offset and is less than a second BVD offset that are in the BVD offsets, a first candidate and a second candidate associated with the respective initial BVD candidate in the K initial BVD candidates can be determined. The first candidate and the second candidate have the same BVD direction as the initial BVD candidate. A BVD offset of the first candidate is an average of the BVD offset and the first BVD offset, and a BVD offset of the second candidate is an average of the BVD offset and the second BVD offset. The processing circuitry determines new TM costs associated with the first candidate and the second candidate, respectively. The processing circuitry determines the BVD list based on updated TM costs including (i) the lowest TM costs in the TM costs corresponding to the K initial BVD candidates and (ii) the new TM costs.

In an example, the processing circuitry determines the BVP. The processing circuitry determines the BV as a sum of the BVP and the determined BVD and reconstructs the current block using the determined BV.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 6 shows a current template of a current block in a current picture and a reference template in a reference picture that corresponds to the current template according to an embodiment of the disclosure.

FIG. 7 shows examples of refinement positions along $k \times \pi/8$ diagonal angles according to an aspect of the disclosure.

FIG. 15 shows a flow chart outlining an encoding process according to some embodiments of the disclosure.

DETAILED DESCRIPTION OF EMBODIMENTS

Figure 1:
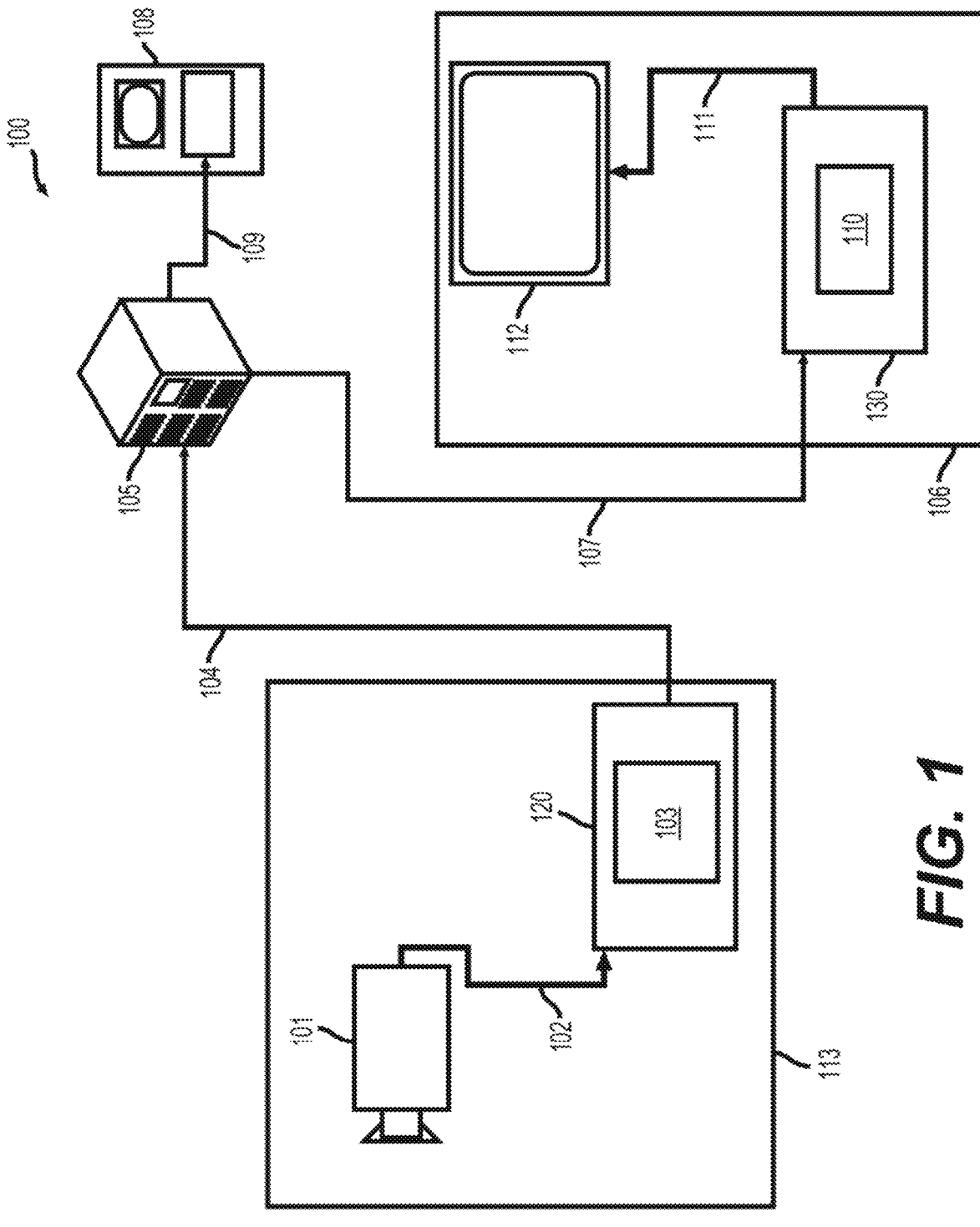
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
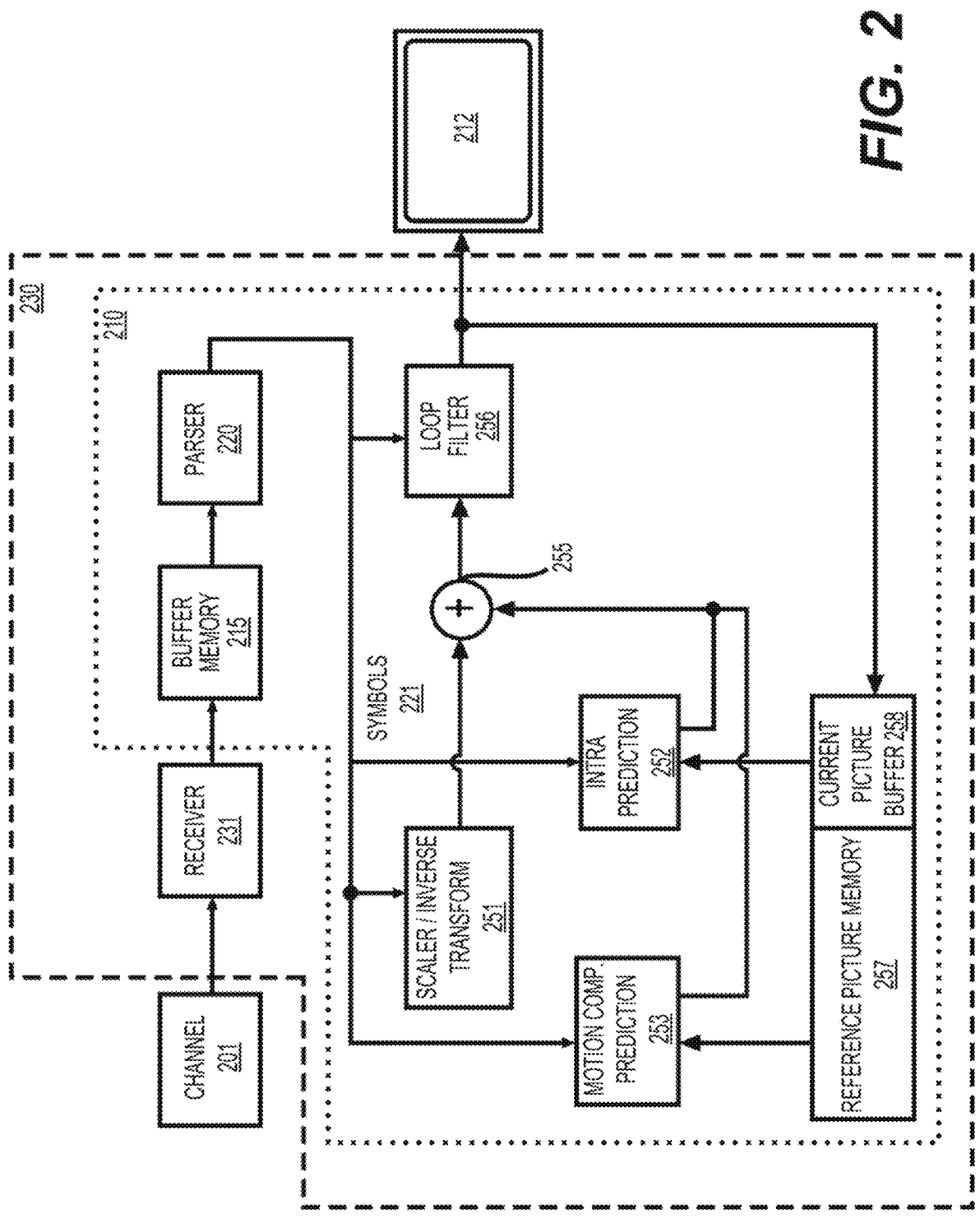
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
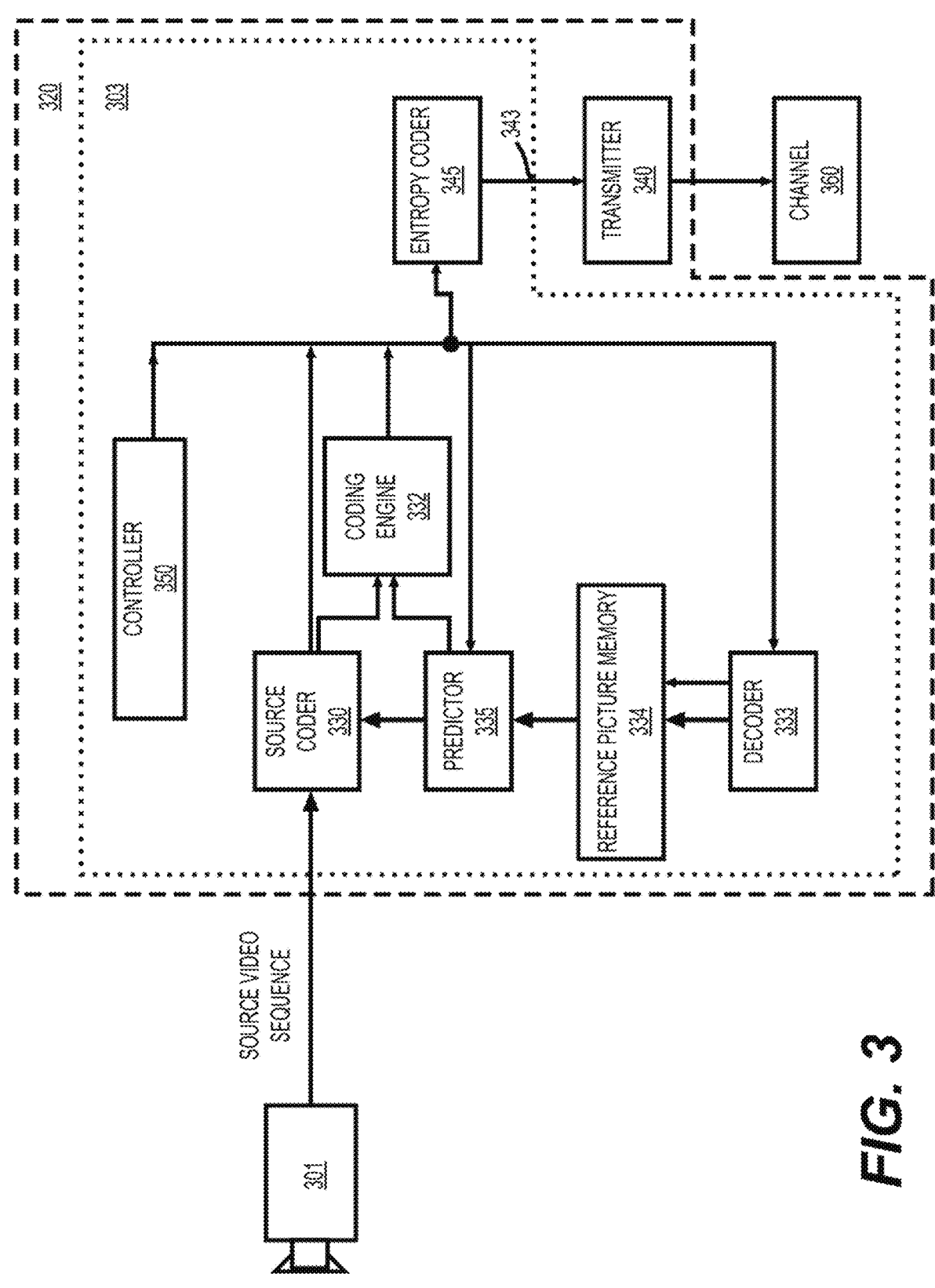
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create.

The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

END Boilerplate

Examples of an intra block copy mode (also referred to as an IBC mode or an IntraBC mode), such as used in HEVC and VVC, are described below.

Figure 4A:
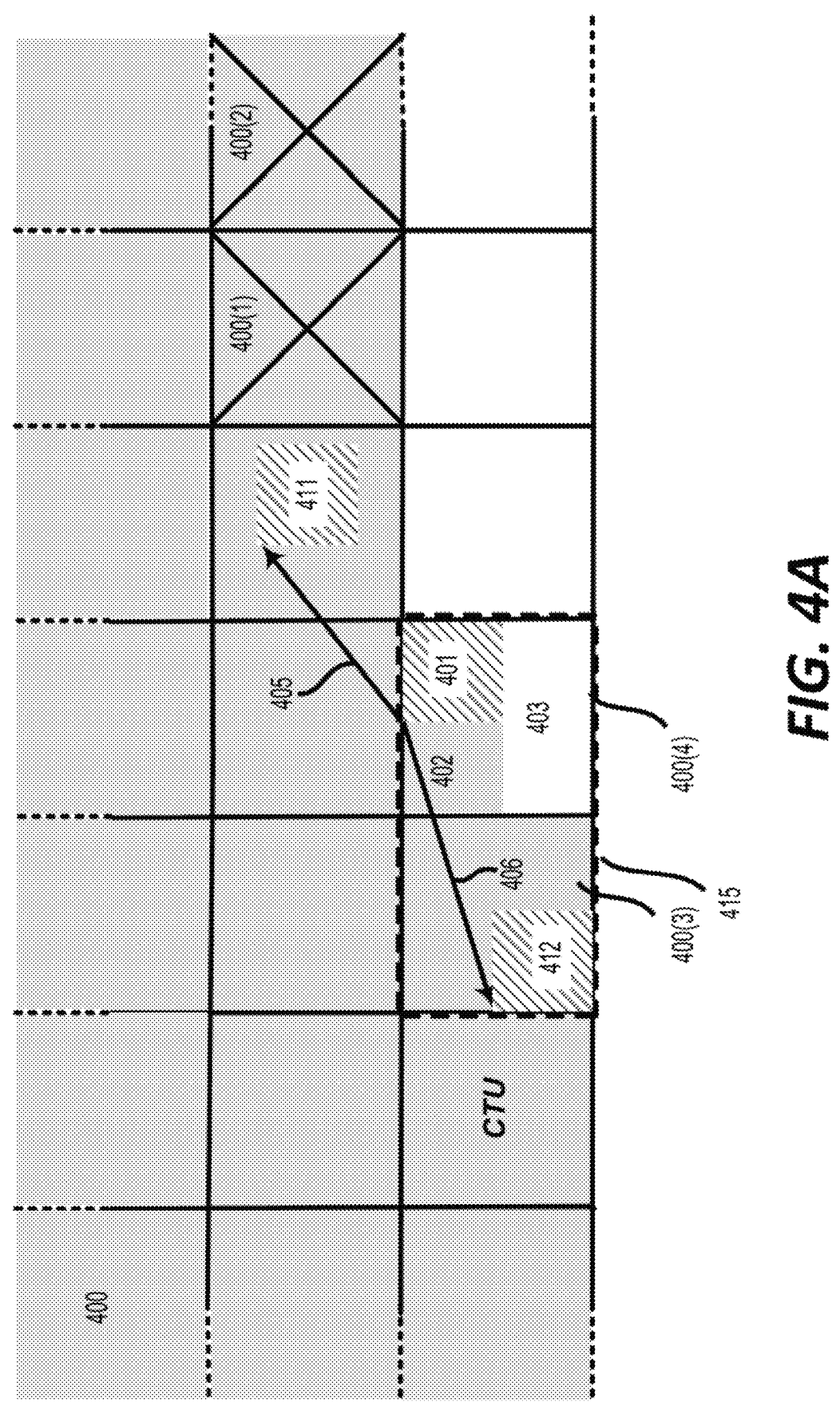
FIG. 4A shows examples of an intra block copy (IBC) mode according to examples of the disclosure.

FIG. 4A shows examples of the IBC mode according to examples of the disclosure. A reference block used to predict a current CU (401) can be indicated by a block vector (BV) associated with the current CU (401). Each square (400) can represent a CTU. A gray-shaded area represents an already coded area or an already coded region, and a white, non-shaded area represents an area or a region to be coded. A current CTU (400(4)) that is under reconstruction includes the current CU (401), a coded area (402), and an area (403) to be coded. In an example, the area (403) will be coded after coding the current CU (401).

In an example, such as in HEVC, the gray-shaded area except for the two CTUs (400(1)-400(2)) that are on the right above the current CTU (400(4)) can be used as a reference area in the IBC mode to allow a Wavefront Parallel Processing (WPP). A BV that is allowed in HEVC can point to a block that is within the reference area (e.g., the gray-shaded area excluding the two CTUs (400(1)-400(2))). For example, a BV (405) that is allowed in HEVC points to a reference block (411).

In an example, such as in VVC, in addition to the current CTU (400(4)), only a left neighboring CTU (400(3)) to the left of the current CTU (400(4)) is allowed as a reference area in the IBC mode. In an example, the reference area used in the IBC mode in VVC is within a dotted area (415) and includes samples that are coded. For example, a BV (406) that is allowed in VVC points to a reference block (412).

In an aspect, the IBC is a tool adopted in HEVC extensions on Screen Content Coding (SCC). The IBC may significantly improve the coding efficiency of screen content materials. Since the IBC mode is implemented as a block level coding mode, block matching (BM) can be performed at the encoder to find an optimal block vector (or a motion vector) for each CU. Here, a block vector (BV) can be used to indicate a displacement from the current block to a reference block, which is already reconstructed inside the current picture. A luma block vector of an IBC-coded CU can be in integer precision. A chroma block vector can round to integer precision as well. When combined with AMVR, the IBC mode can switch between 1-pel and 4-pel motion vector precisions. An IBC-coded CU can be treated as the third prediction mode other than intra or inter prediction modes. The IBC mode can be treated as a third prediction mode that is different from the intra prediction and the inter prediction. The IBC mode can be applicable to the CUs with both width and height smaller than or equal to 64 luma samples.

At the encoder side, hash-based motion estimation can be performed for the IBC mode. The encoder performs RD check for blocks with either width or height no larger than 16 luma samples. For a non-merge mode, the block vector search can be performed using hash-based search first. If a hash search does not return a valid candidate, a block matching based local search will be performed.

In the hash-based search, hash key matching (32-bit CRC) between the current block and a reference block can be extended to allowed block sizes (e.g., all allowed block sizes). The hash key calculation for every position in the current picture can be based on subblocks (e.g., 4×4 subblocks). For the current block of a larger size, a hash key can be determined to match that of the reference block when the hash keys of the subblocks (e.g., all the hash keys of all 4×4 subblocks) match the hash keys in the corresponding reference locations. If hash keys of multiple reference blocks are found to match that of the current block, the block vector costs of each matched reference can be calculated and the one with the minimum cost is selected.

In block matching search, in an example, the search range is set to cover both the previous and current CTUs.

At a CU level, the IBC mode is signaled with a flag and the IBC mode can be signaled as an IBC AMVP mode or an IBC skip/merge mode as follows:

IBC skip/merge mode: a merge candidate index is used to indicate which of the block vectors in the list (e.g., the merge list) from neighboring candidate IBC coded blocks is used to predict the current block. The merge list can include spatial, HMVP, and pairwise candidates.

IBC AMVP mode: a block vector difference is coded in the same way as a motion vector difference. The block vector prediction method uses two candidates as predictors, one from a left neighbor and one from an above neighbor (if IBC coded, e.g., if the left neighbor and the above neighbor are IBC coded). When either neighbor is not available, a default block vector will be used as a predictor. A flag is signaled to indicate the block vector predictor index.

Figure 4B:
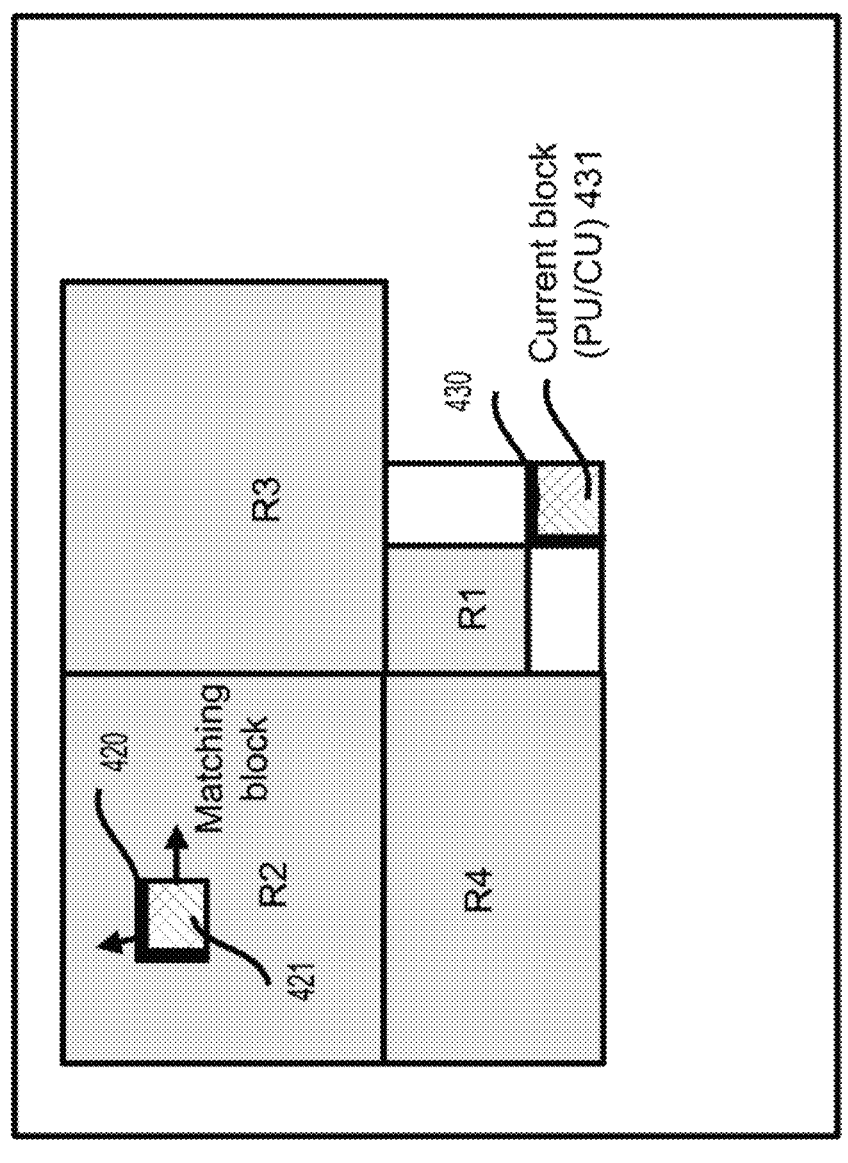
FIG. 4B shows an example of an intra template matching prediction (IntraTMP) mode according to an aspect of the disclosure.

FIG. 4B shows an example of an intra template matching prediction (IntraTMP) mode according to an aspect of the disclosure. In an aspect, such as in Enhanced Compression Model (ECM) software, the IntraTMP is a special intra prediction mode that can copy the best prediction block (e.g., a matching block (421)) from a reconstructed part of a current frame (or a current picture), where a template (e.g., an L-shaped template) (420) of the best prediction block can match a current template (430) of a current block (431) (e.g., a current PU or a current CU). For a predefined search range, an encoder can search for the most similar template to the current template in the reconstructed part of the current frame and can use the corresponding block as a prediction block. The encoder can signal the usage of the IntraTMP mode, and the same prediction operation can be performed at the decoder side.

The prediction signal can be generated by matching the current template (430), such as an L-shaped causal neighbor of the current block (431), with a template of another block in a predefined search area. An exemplary search area shown in FIG. 4B can include multiple CTUs (or superblocks). Referring to FIG. 4B, the search area can include a current CTU R1 (e.g., a portion of the current CTU R1), a top-left CTU R2, an above CTU R3, and a left CTU R4. The cost function can include any suitable cost function, such as a sum of absolute differences (SAD).

Within each region, the decoder can search for a template that has the least cost (e.g., the least SAD) with respect to the current template and can use a block associated with the template having the least cost as a prediction block.

Dimensions of regions indicated by (SearchRange_w, SearchRange_h) can be set to be proportional to a block dimension (BlkW, BlkH) to have a fixed number of SAD comparisons per pixel. Thus, $$SearchRang\_w = a \times BlkW \qquad \text{Eq. (1)}$$

$$SearchRange\_h = a \times BlkH \qquad \text{Eq. (2)}$$

The parameter 'a' can be a constant that controls the trade-off between the gain and the complexity. In an example, 'a' is 5.

In an example, to speed-up the template matching process, the search range (e.g., the search range of all search regions) is subsampled by a factor of 2, which leads to a reduction of a template matching search by a factor of 4. After the best match (or an initial best match) is found, a refinement process can be performed. The refinement is done via a second template matching search around the best match (or the initial best match) with a reduced range. The reduced range is defined as min (BlkW, BlkH)/2.

The Intra template matching tool can be enabled for CUs with size less than or equal to 64 in width and height. The maximum CU size (e.g., 64) for intra template matching can be configurable.

In the disclosure, the term "IBC" can refer to the IBC mode as described in FIG. 4A or a variant, the IntraTMP mode described in FIG. 4B or a variant.

In an example, in order to further improve the compression efficiency of certain video coding technologies used in VVC standard, tools beyond VVC capability may be used. Template matching (TM) can refine the motion at the decoder side. In the TM mode, motion can be refined by constructing a template from the left and the above neighboring reconstructed samples and finding the closest matching between the template in the current picture and the reference frame.

Figure 5A:
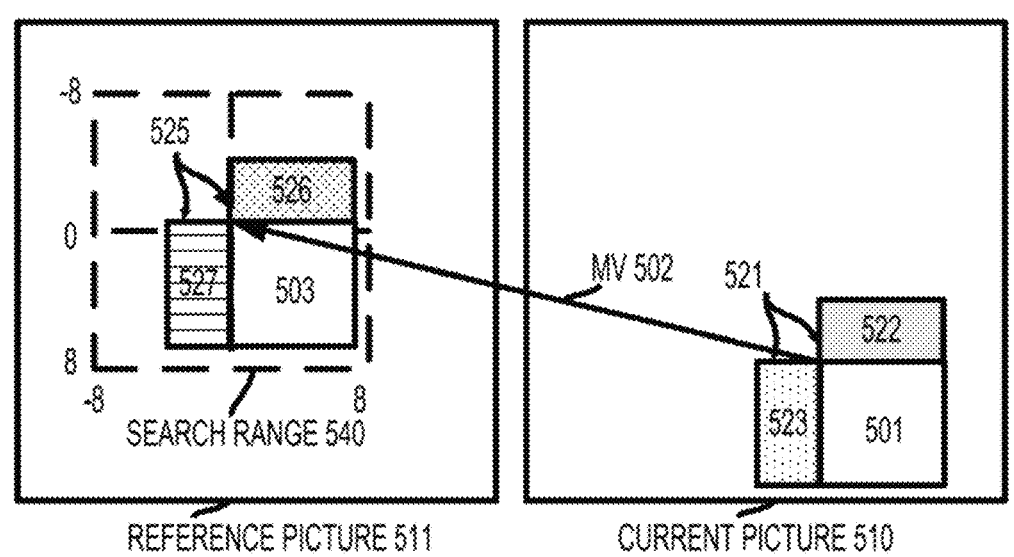
FIG. 5A shows an example of a template matching procedure according to an aspect of the disclosure.

FIG. 5A shows an example of a template matching procedure according to an aspect of the disclosure. In FIG. 5A, a current template (521) of a current block (501) in a current picture (510) can have any suitable shape and any suitable size. In an embodiment, the current template (521) of the current block (501) includes a top template (522) and a left template (523). Each of the top template (522) and the left template (523) can have any suitable shape and any suitable size. The top template (522) can include samples in one or more top neighboring blocks of the current block (501). In an example, the top template (522) includes N1 (e.g., 1 or 4) rows of samples in one or more top neighboring blocks of the current block (501). The left template (523) can include samples in one or more left neighboring blocks of the current block (501). In an example, the left template (523) includes N2 (e.g., 1 or 4) columns of samples in the one or more left neighboring blocks of the current block (501).

In an embodiment, an initial MV such as an MV (502) points from the current block (501) to a reference block (503) in a reference picture (511). A shape and a size of a reference template can match the shape and the size of the current template (521), respectively. In FIG. 5A, a reference template (525) of the reference block (503) in the reference picture (511) can have an identical shape and an identical size as those of the current template (521) in the current picture (510). For example, the reference template (525) of the reference block (503) includes a top template (526) in the reference picture (511) and a left template (527) in the reference picture (511). The top template (526) can include samples in one or more top neighboring blocks of the reference block (503). The left template (527) can include samples in one or more left neighboring blocks of the reference block (503).

Referring to FIG. 5A, a better MV is to be searched around the initial motion vector (e.g., the MV (502)) of the current CU (e.g., the current block (501)) within a search range (e.g., a [−8, +8]-pel search range) (540). For example, TM costs corresponding to MV candidates (e.g., differences between the MV candidates and the MV (502) are in the search range (540)) are determined based on respective pairs of templates. For example, a pair of templates includes the current template (521) and a reference template associated with an MV candidate. When the MV candidate is the MV (502), the reference template is the reference template (525). In an example, a TM cost corresponding to the MV candidate is determined based on a sum of absolute difference (SAD) between the current template (521) and the reference template. Other functions, such as sum of squared errors (SSE), a variance, a partial SAD, or the like can also be used to determine the TM cost. The TM cost can indicate matching between the current template (521) and the reference template. In an example, the final MV is determined based on the TM costs. For example, the final MV is determined as the MV candidate corresponding to the lowest TM cost.

In an example, the template matching is modified as below: a search step size is determined by the AMVR mode and the TM can be cascaded with a bilateral matching process.

An example of Adaptive Reordering of Merge Candidates with Template Matching (ARMC-TM) is described below. The merge candidates can be adaptively reordered with template matching (TM). The reordering method can be applied to a regular merge mode, a TM merge mode, and an affine merge mode (excluding an SbTMVP candidate). In an example, for the TM merge mode, merge candidates are reordered before the refinement process.

In an example, an initial merge candidate list is firstly constructed according to a given checking order, such as spatial merge candidate(s), TMVPs, non-adjacent merge candidate(s), HMVPs, pairwise merge candidate(s), virtual merge candidates. Then the candidates in the initial list (e.g., the initial merge candidate list) are divided into subgroups (e.g., several subgroups). In an example, for the TM merge mode, an adaptive DMVR mode, each merge candidate in the initial list is firstly refined by using TM/multi-pass DMVR such as TM and/or multi-pass DMVR. Merge candidates in each subgroup can be reordered to generate a reordered merge candidate list and the reordering can be according to cost values (such as TM costs) based on template matching. An index of a selected merge candidate in the reordered merge candidate list is signaled to the decoder. In an example, for simplification, merge candidates in the last but not the first subgroup are not reordered. In an example, all the zero candidates from the ARMC reordering process are excluded during the construction of a merge motion vector candidates list. The subgroup size can be set to 5 for the regular merge mode and the TM merge mode. The subgroup size can be set to 3 for the affine merge mode.

The template matching cost (TM cost) of a merge candidate during the reordering process can be measured by the SAD between samples of a template (e.g., a current template) of the current block and the corresponding reference samples. The template (e.g., the current template) can include a set of reconstructed samples neighboring to the current block. Reference samples of the template are located by the motion information of the merge candidate.

Figure 5B:
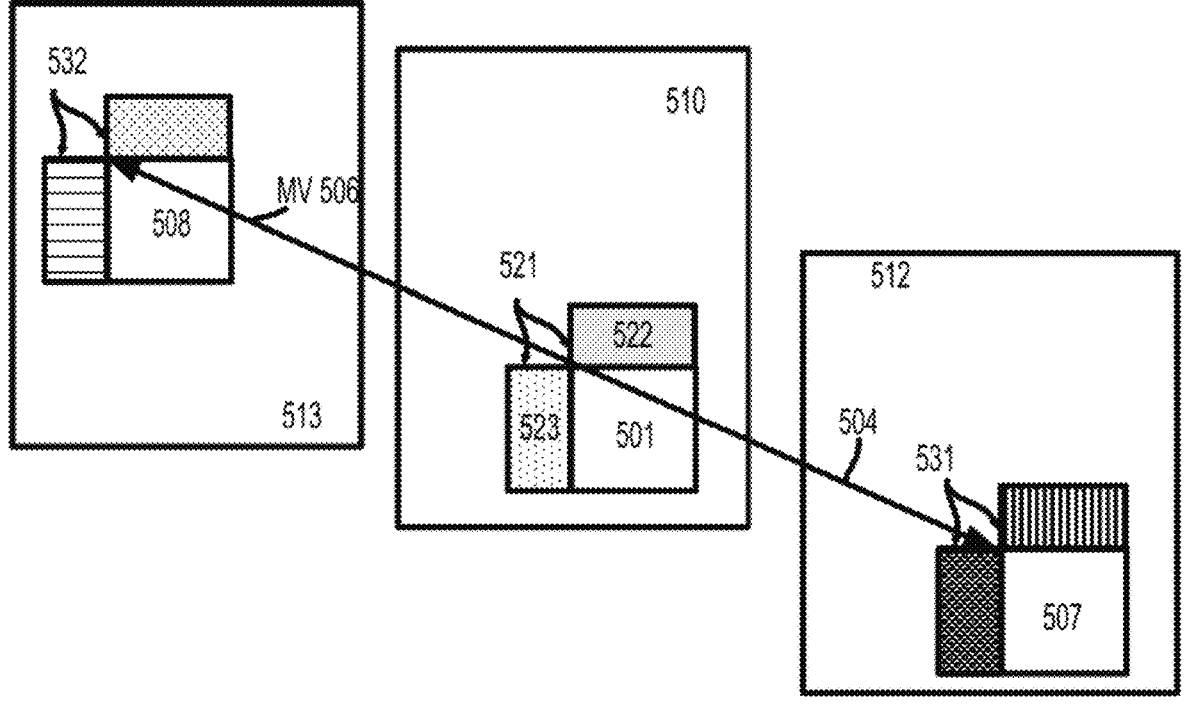
FIG. 5B shows a template and reference samples of the template in reference pictures according to an aspect of the disclosure.

FIG. 5B shows the template and reference samples of the template in reference pictures according to an aspect of the disclosure. When a merge candidate utilizes a bi-directional prediction, the reference samples of the template of the merge candidate can be generated by bi-prediction as shown in FIG. 5B. For example, when a merge candidate includes two MVs pointing to reference templates in two reference pictures, a TM cost can be determined as shown in FIG. 5B. Referring to FIG. 5B, a merge candidate in the merge candidate list includes two MVs, such as an MV (504) pointing to a reference block (507) in a reference picture (512) and an MV (506) pointing to a reference block (508) in a reference picture (513). A reference template (531) is associated with the reference block (507) in the reference picture (512). A reference template (532) is associated with the reference block (508) in the reference picture (513). The reference templates (531)-(532) can have an identical shape and an identical size as those of the current template (521). A TM cost can be determined based on the current template (521) and the reference templates (531)-(532). In an example, a predictor template of the merge candidate is determined based on the reference templates (531)-(532), for example, the predictor template is an average (e.g., a weighted average) of the reference templates (531)-(532). The TM cost can be determined based on the current template (521) and the predictor template.

For subblock-based merge candidates with a subblock size equal to WsubxHsub, the above template comprises several sub-templates with the size of WsubxM1 (e.g., Wsubx1), and the left template comprises several sub-templates with the size of M2xHsub (e.g., 1xHsub). M1 and M2 are positive integers. As shown in FIG. 6, the motion information of the subblocks in the first row (e.g., A-D) and the first column (e.g., A, E, F, and G) of a current block (601) is used to derive the reference samples of each sub-template.

When a merge candidate is a subblock-based merge candidate, a reference template can be determined as shown in FIG. 6. FIG. 6 shows a current template (602) of the current block (601) in a current picture (611) and a reference template (603) in a reference picture (612) that corresponds to the current template (602) according to an embodiment of the disclosure. The current block (601) has subblock-based motion information, and the reference template (603) can be determined based on motion information that is indicated by arrows associated with respective subblocks A-G of the current block (601). Each of the subblocks A-G has a size of WsubxHsub. In an example, the current template (602) includes an above template (605) and a left template (606). The above template (605) can include sub-templates (e.g., 4 sub-templates in FIG. 6) with the size of WsubxM1 (e.g., Wsubx1). The left template (606) can include sub-templates (e.g., 4 sub-templates in FIG. 6) with the size of M2xHsub (e.g., 1xHsub). The motion information that is indicated by the arrows associated with the subblocks A-G in the first row and the first column of current block (601) can be used to derive sub-templates (or reference subblock templates) (631-638) in the reference template (603).

The motion information (indicated by the arrows associated with A-G) of the respective subblocks A-G in the current block (601) can point to reference subblocks AA-GG in the reference picture (612). The reference template (603) can include the multiple reference subblock templates (631)-(638) that are associated with the reference subblocks AA-GG. For example, the reference subblock templates (631)-(634) are above the reference subblocks AA-DD, and the reference subblock templates (635)-(638) are to the left of the reference subblocks AA and EE-GG. The reference template (603) can include an above reference template (622) and a left reference template (623). The above reference template (622) can include the reference subblock templates (631)-(634). The left reference template (623) can include the reference subblock templates (635)-(638). For a subblock-based merge candidate with a subblock size equal to WsubxHsub, an above template (e.g., the above reference template (622)) can include multiple sub-templates with the size of WsubxM1, and a left template (e.g., the left reference template (623)) can include multiple sub-templates with the size of M2xHsub. In an example, M1 is 1. In an example, M2 is 1.

Samples in the reference template (603) can also be referred to as reference samples of the current template (602). In an example, the samples in the reference template (603) are already reconstructed.

In an example, the reference subblocks AA-GG can be determined as below. A collocated block (613) in the reference picture (612) can be determined based on the current block (601). Collocated subblocks A'-G' in the collocated block (613) can correspond to the subblocks A-G, respectively, as shown in FIG. 6. The reference subblocks AA-GG can be determined based on the collocated subblocks A'-G' and the motion information (indicated by arrows associated with A'-G') of the respective subblocks A-G in the current block (601).

In the reordering process, a candidate can be considered as redundant if the cost difference between a candidate and its predecessor is inferior to a lambda value (e.g., $\lambda$), e.g., $|D1-D2|<\lambda$, where D1 and D2 are the costs obtained during the first ARMC ordering and $\lambda$ is the Lagrangian parameter used in the RD criterion at the encoder side. In an example, the algorithm is defined as the following:

Determine the minimum cost difference between a candidate and its predecessor among all candidates in the list.

If the minimum cost difference is superior or equal to $\lambda$ (e.g., the minimum cost difference $\geq\lambda$), the list is considered diverse (e.g., diverse enough) and the reordering stops.

If this minimum cost difference is inferior to $\lambda$ (e.g., the minimum cost difference $<\lambda$), the candidate is considered as redundant, and the candidate is moved to a further position in the list. This further position is the first position where the candidate is diverse enough compared to its predecessor.

The algorithm stops after a finite number of iterations (if the minimum cost difference is not inferior to $\lambda$, e.g., the minimum cost difference $\geq\lambda$).

This algorithm can be applied to the regular mode, the TM mode, the BM mode, and the Affine merge mode. A similar algorithm can be applied to the Merge MMVD and sign MVD prediction methods which also use ARMC for the reordering.

The value of $\lambda$ in the algorithm described above can be set to the $\lambda$ of the rate distortion criterion used to select the best merge candidate at the encoder side for low delay configuration and to the value $\lambda$ corresponding to another QP for Random Access configuration. A set of $\lambda$ values corresponding to each signaled QP offset can be provided in the sequence parameter set (SPS) or in the Slice Header for the QP offsets which are not present in the SPS.

The ARMC design is also applicable to the AMVP mode where the AMVP candidates are reordered according to the TM costs, such as the TM costs associated with the respective AMVP candidates. For the template matching for advanced motion vector prediction (TM-AMVP) mode, an initial AMVP candidate list is constructed, followed by a refinement from TM to construct a refined AMVP candidate list. In addition, an MVP candidate with a TM cost larger than a threshold, which is equal to five times of the cost of the first MVP candidate, can be skipped.

In an example, when wrap around motion compensation is enabled, the MV candidate is clipped with a wrap around offset taken into consideration.

TM based reordering for the MMVD mode and the affine MMVD mode are described as follows. The MMVD offsets can be extended for the MMVD mode and the affine MMVD mode. FIG. 7 shows examples of additional refinement positions along k×π/8 diagonal angles according to an aspect of the disclosure. In the example shown in FIG. 7, a direction can point from a position (701) to another position indicated by a circle, e.g., directions (721)-(724) point from the position (701) to positions (711)-(714), respectively. In an example, a number of directions is increased from 4 directions (721)-(724) to 16 directions indicated by the circles. In an example, the directions (721)-(724) correspond to angles of 0, π/2, π, and 3π/2, and the 16 directions correspond to angles of 0 to 15π/8 with an increment of π/8 between adjacent directions.

Further, based on the SAD cost between the template (e.g., a current template including one row above and one column left to the current block) and a reference of the template for each refinement position, the possible MMVD refinement positions (e.g., 16×6 MMVD refinement positions) for each base candidate (e.g., all the possible MMVD refinement positions (16×6) for each base candidate) can be reordered. The reference of the template can be referred to as a reference template. In an example, the 16×6 MMVD refinement positions include combinations of 16 MMVD directions shown in FIG. 7 and 6 MMVD magnitudes (also referred to as MMVD offsets). Each of the MMVD refinement positions indicates a respective MMVD candidate.

In addition, the top ⅛ refinement positions (e.g., 16×⅝=12 refinement positions) with the smallest template SAD costs can be kept as available positions, and can be used consequently for MMVD index coding. The MMVD index can be binarized by the rice code with the parameter equal to 2. The MMVD index can indicate which MMVD or MMVD refinement position in the top ⅛ refinement positions is selected.

The affine MMVD reordering can be extended, in which additional refinement positions along k×π/4 diagonal angles can be added. After reordering, top ½ refinement positions with the smallest template SAD costs can be kept. Referring to FIG. 7, the 4 directions (721)-(724) can be extended to 8 directions indicated by the circles (711)-(718) in the affine MMVD reordering. In an example, the 8 directions indicated by the circles (711)-(718) correspond to angles of 0 to 7π/4 with an increment of π/4 between adjacent directions. For example, an angle between the directions (721) and (725) is 2π/8.

The first L motion candidates in the candidate list before being reordered are utilized as the base candidates for the MMVD mode and the affine MMVD mode. In an example, L is equal to 3 for the MMVD mode, and L is one of [1, 3] depending on the neighboring block affine flags for the affine MMVD mode. Two ways of adding MMVD offsets may be allowed, including the 'two-side' and 'one-side', depending on whether the offset of the other reference picture list is mirrored or directly set to zero. Which way is applied to one block is dependent on the TM cost.

In the IBC mode such as shown in FIG. 4A or 4B, a BV can indicate a reference block of a current block to be coded.

The reference block and the current block can be in a current picture. A BV can be coded using any suitable method. In an aspect, a BV can be coded using a BV predictor (BVP) and a BV difference (BVD). In an example, the BV is a sum (vector sum) of the BVP and the BVD. The BVD can be coding using any suitable method. In an example, the BVD is determined (e.g., selected) from a list of BVD candidates. In an example, the BVD candidates in the list of BVD candidates are pre-defined. In an example, the BVD candidates are determined based on initial BVD candidates, such as in an IBC Merge Mode with Block Vector Differences (MBVD) (referred to as an IBC-MBVD mode) described below.

In an example of the IBC-MBVD mode, a BVD can be referred to as an MBVD, and a BVD candidate can be referred to as an MBVD candidate. An MBVD or an MBVD candidate can be a vector indicated by an MBVD amplitude or an MBVD magnitude (also referred to as an offset or an MBVD offset) and a direction (also referred to as an MBVD direction). A BV candidate can be a sum (e.g., a vector sum) of a BVP and an MBVD candidate.

A BV can be coded using a BVP and an MBVD. The MBVD can be determined (e.g., selected) from MBVD candidates in an MBVD list or an MBVD candidate list (e.g., an IBC-MBVD list or an IBC-MBVD candidate list). An IBC-MBVD list can be determined using any suitable method. In an example, an IBC-MBVD list is determined based on a set of offsets (also referred to as a distance set) and a set of directions (e.g., a plurality of directions shown in FIG. 7).

The term "template matching" or "TM" can refer to the TM described above such as in FIGS. 5A, 5B, 6, and 7 or a variant.

Figure 8:
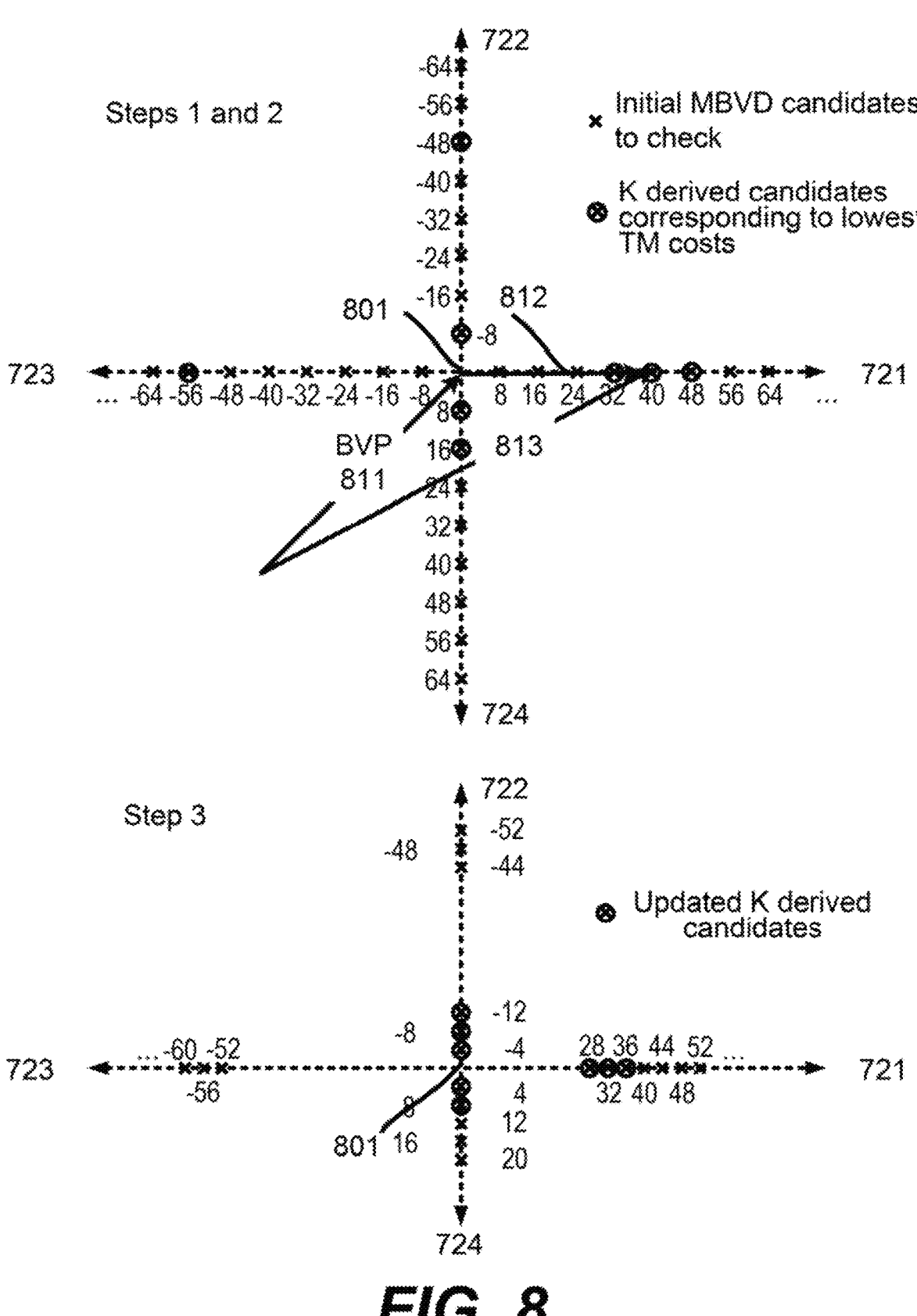
FIG. 8 shows an exemplary process that derives an IBC Merge Mode with Block Vector Differences (MBVD) list according to an aspect of the disclosure.

An IBC-MBVD list can be derived from the sample positions along the MBVD directions. Referring to FIG. 8, the MBVD directions include the directions (721)-(724) described in FIG. 7. The sample positions include positions indicated by "x". Each position indicated by "x" can indicate a BVD candidate (e.g., an MBVD candidate). Referring to FIG. 8, an MBVD candidate (812) associated with the position 40 (40-pel or 40 samples) along the direction (721) has an amplitude of 40-pel and a direction along the direction (721). The MBVD candidate (812) can indicate that a BV candidate (813) is shifted from the BVP (811) by an offset of 40-pel along the direction (721). For example, the BV candidate (813) is a vector sum of the BVP (811) and the MBVD candidate (812). In FIG. 8, the BVP (811) is indicated by a position (801), for example, the BVP (811) points to the position (801).

The MBVD candidates search can start with checking template costs (also referred to as TM costs such as template SAD costs) of offsets (e.g., including the offset 40-pel) added to the BVP (811) along each direction with an interval of M-pel. M can be a positive integer such as 8. The search process repeats around the K candidates having the lowest TM costs with the half interval (e.g., M/2). K is a positive integer, such as 8. The MBVD list (or the IBC-MBVD list) can be derived when the interval reaches 1-pel, the K candidates with the lowest TM costs are included into the final list (e.g., the final IBC-MBVD list).

Adaptive BVD offsets along MBVD directions may be allowed. In an example, an MBVD list (or an IBC-MBVD list) of K candidates (e.g., K MBVD candidates) with lowest TM costs (e.g., template SAD costs) are derived with following steps, such as shown in FIG. 8.

Step 1. Denote the largest offset as N-pel, e.g., N=128, the number of directions is $N_D$, e.g., $N_D$=4 (e.g., left, right, top, and bottom as indicated by (721), (723), (722), and (724) in FIGS. 7-8), the starting search interval M-pel, e.g., M=8, the number of candidates in the MBVD list is K, e.g., K=8.

Step 2. Along each direction, check the TM costs (e.g., TM SAD costs calculated using SAD) for an offset of every M-th position not exceeding N as shown in FIG. 8. The K lowest TM costs (TM SAD costs) candidates are kept in the list. Referring to FIG. 8, 8 candidates (e.g., 8 MBVD candidates marked by circles) associated with positions (or offsets) 32, 40, and 48 along the direction (721); positions −8 and −48 along the direction (722); a position −56 along the direction (723); and positions 8 and 16 along the direction (724) have the lowest TM costs among the MBVD candidates.

Step 3. For each candidate in the list, check the TM cost (e.g., the TM SAD cost) of the two candidates with an offset equal to +/−M/2 (+M/2 and −M/2) along the direction. For example, M/2 is 4, and the offsets are +4 and −4. The two candidates include a first candidate corresponding to +4 and a second candidate corresponding to −4. For the candidate corresponding to the position 32 along the direction (721), the first candidate corresponds to the offset of +4, and thus the first candidate corresponds to a position (32+4) or 36 along the direction (721), and the second candidate corresponds to the offset of −4 and thus the second candidate corresponds to a position (32−4) or 28 along the direction (721) (FIG. 8). The K lowest TM SAD cost candidates are kept in the list. In Step 3 of FIG. 8, 8 candidates (updated 8 candidates) indicated by the circles are kept in the list. The 8 candidates include the MBVD candidates corresponding to positions 28, 32, 36 along the direction (721); positions −4, −8, −12 along the direction (722); and positions 4 and 8 along the direction (724).

Step 4. Repeat Step 3, while reducing the previous interval by half until the interval reaches 1-pel.

In an example, M is 8 and K is 8. Referring to Step 1 in FIG. 8, the MBVD candidates (also referred to as the initial MBVD candidates because the MBVD candidates in Step 1 is obtained prior to updating the MBVD candidates) associated with positions indicated by "x" along each of the MBVD directions (721)-(724) have amplitudes of 8-pel, 16-pel, 24-pel, 32-pel, 40-pel, 48-pel, 56-pel, 64-pel, . . . , N-pel along each of the directions (721)-(724). N can be a positive integer, such as 128, 256, or the like. N can be pre-defined. In some examples, N is less than 128, such as 16, 32, 64, or the like. A first set of offsets (also referred to as a first distance set) can include {8-pel, 16-pel, 24-pel, 32-pel, 40-pel, 48-pel, 56-pel, 64-pel, . . . , N-pel}. Each of the offsets in the first distance set can be an MBVD amplitude of an initial MBVD candidate. An initial MBVD candidate can have any suitable direction. In an example, an initial MBVD candidate has a direction that is one of the directions (721)-(724) such as shown in FIG. 8.

In an aspect, the initial MBVD candidate can be obtained based on a set of offsets {$O_1$, $O_2$, $O_3$, . . . , $O_{J1}$} (e.g., the first distance set) and a set of directions {$D_1$, $D_2$, $D_3$, . . . , $D_{J2}$}(e.g., the directions (721)-(724), a plurality of directions in the directions shown in FIG. 7). Each of the initial MBVD candidates can have an amplitude from the set of offsets {$O_1$, $O_2$, $O_3$, . . . , $O_{J1}$} and a direction from the directions {$D_1$, $D_2$, $D_3$, . . . , $D_{J2}$}. In an example, a number of the initial MBVD candidates is J1×J2.

In Step 2, the TM costs of the respective initial MBVD candidates are determined. A TM cost of an initial MBVD candidate can be determined based on a current template of the current block and a reference template. In an example, a candidate reference block is indicated by a BV candidate (e.g., a sum of the BVP (811) and the initial MBVD candidate). The reference template can include neighboring samples of the candidate reference block, such as one row above the candidate reference block and one column to the left of the candidate reference block. The K (e.g., 8) MBVD candidates associated with the lowest TM costs are kept in the list. Referring to FIG. 8, the 8 MBVD candidates are indicated by the circles (e.g., the positions 32, 40, and 48 along the direction (721); the positions −8 and −48 along the direction (722); the position −56 along the direction (723); and the positions 8 and 16 along the direction (724)).

In Step 3, a search of updated MBVD candidates (e.g., a refined search of updated MBVD candidates) is performed around the MBVD candidates in the list (e.g., obtained in Step 2). In an example, the interval (or a search interval) is reduced by half and thus becomes 4. For each of the MBVD candidates in the list (e.g., obtained in Step 2), the TM costs of the two candidates with an offset equal to +/−M/2 (+4 and −4) along the direction of the respective MBVD candidate are obtained, as described above. Referring to Step 3 in FIG. 8, the TM costs obtained from Steps 2 and 3 correspond to the positions marked with "x" and circles including positions 28, 32, 36, 40, 44, 48, and 52 along the direction (721), the positions −4, −8, −12, −44, −48, and −52 along the direction (722), the positions −52, −56, and −60 along the direction (723), and the positions 4, 8, 12, 16, and 20 along the direction (724). In an example, updated MBVD candidates (e.g., 8 updated MBVD candidates) are determined based on the TM costs obtained from Steps 2 and 3. Referring to FIG. 8, the 8 updated MBVD candidates correspond to the positions 28, 32, and 36 along the direction (721), the positions −4, −8, and −12 along the direction (722), and the positions 4 and 8 along the direction (724).

In an example, Step 3 is repeated with an interval of 2 and then with an interval of 1, respectively. In an example, 8 final MBVD candidates are selected based on TM costs. In an example, an index (e.g., an MBVD index) is signaled to indicate which of the 8 final MBVD candidates is selected as the MBVD to be used with the BVP to determine the BV.

In an example, a number of MBVD candidates and MBVD index signaling is the same as ECM-7.0.

In some examples such as the example described above in Step 1 of FIG. 8, the MBVD offsets of the respective initial MBVD candidates are equally spaced every M-th position (e.g., every 8-th position) along the respective MBVD directions. An interval can indicate a difference between a pair of adjacent offsets in the set of offsets. For example, an interval refers to a number of samples or pixels (pel) between two adjacent offsets, such as an interval of 8 samples between offsets 40 and 48 samples along the direction (721). In the disclosure, the terms "interval" and "interval size" can be used interchangeably. Equal intervals between pairs of adjacent offsets are used in the first distance set of FIG. 8.

Figures 9, 10, 11, 12:
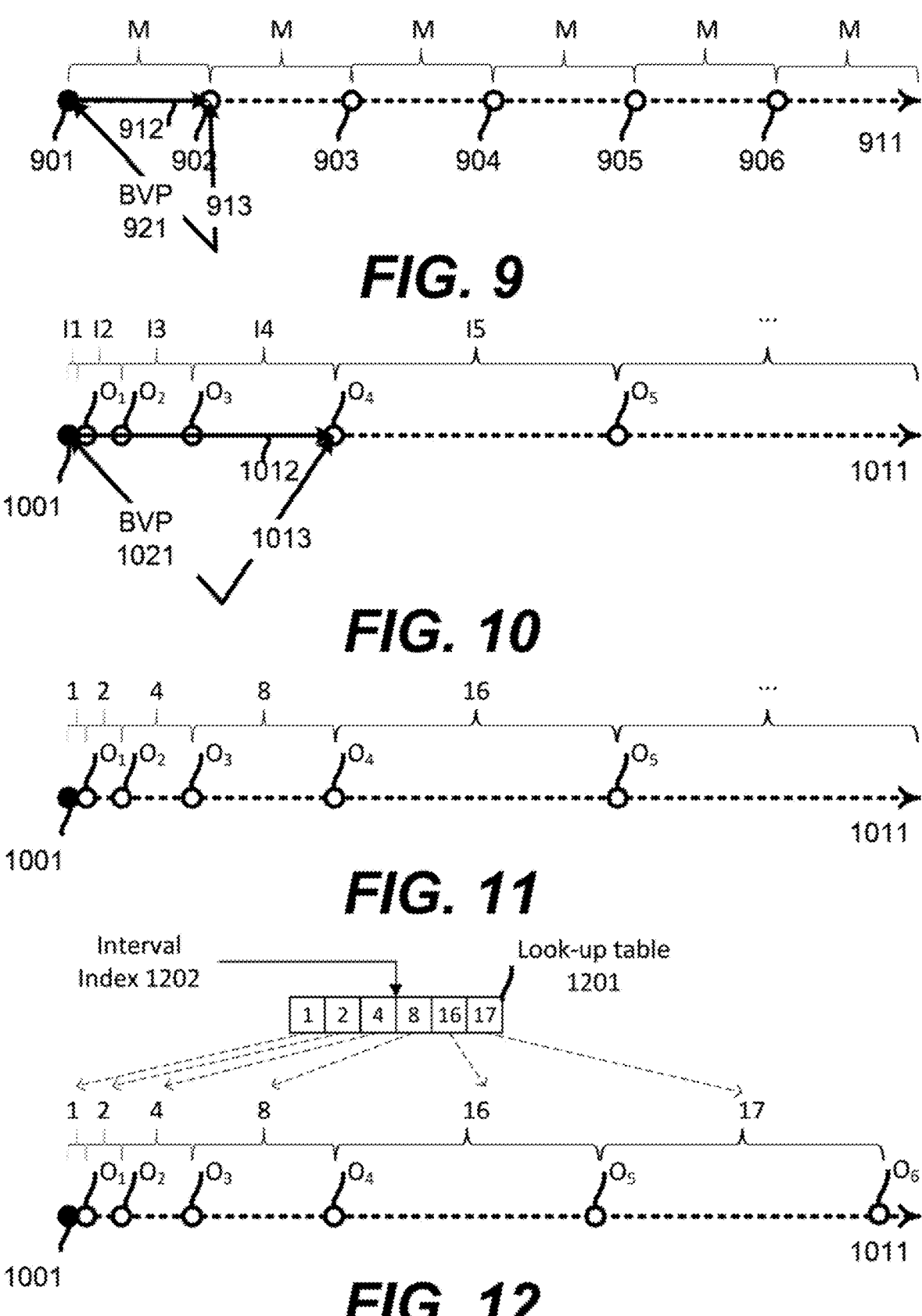
FIG. 9 shows an example of a constant offset for every M-th position in an MBVD list construction by using TM according to an aspect of the disclosure.
FIG. 10 shows an example of a set of offsets according to an aspect of the disclosure.
FIG. 11 shows an example of a set of offsets according to an aspect of the disclosure.
FIG. 12 shows an example of a set of offsets according to an aspect of the disclosure.

In an example, the interval is M-pel (e.g., 8-pel), such as shown in FIG. 9. FIG. 9 shows an example of a constant offset for every M-th position in the MBVD list construction by using TM. In FIG. 9, a set of offsets with respect to a position (901) includes {M, 2M, 3M, 4M, 5M, . . . } corresponding to the offsets (902)-(906) and the like. An interval size between two adjacent offsets is M. The parameter M can be pre-defined, and thus is a constant. Accordingly, the offsets (902)-(906) can be considered as being constant. The offsets (902)-(906) with respect to the position (901) are equally spaced every M-th position along an MBVD direction (911). In FIG. 9, a BVP (921) is indicated by the position (901), for example, the BVP (921) points to the position (901). A BV candidate (913) can be a vector sum of the BVP (921) and an MBVD candidate (e.g., (912)). The MBVD candidate (912) has an amplitude of the offset (902) (e.g., M) along the direction (911). The MBVD direction (911) can represent any of the directions shown in FIG. 7.

The term "MBVD" can refer to an MBVD as described above, such as in FIGS. 8-9 or a variant. In an example, the term "MBVD" is referred to as the IBC-MBVD.

As described above in FIGS. 8-9, an interval size or an interval between two adjacent offsets is a constant indicated by M (e.g., 8). If M is 8, the set of offsets can be the first distance set. In an example, first intervals between first pairs of adjacent offsets in a set of offsets are not identical and second intervals between second pairs of adjacent offsets in the set of the offsets are identical. In an example, a second distance set includes {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}. The first intervals between the pairs of adjacent offsets in {1-pel, 2-pel, 4-pel} include 1-pel and 2-pel and thus are not identical. The second intervals between the pairs of adjacent offsets in {16-pel, 24-pel, 32-pel} include 8-pel and 8-pel and thus are identical.

In various examples, a difference between the BVP and the BV is relatively small, and thus a BVD is relatively small (e.g., close to zero). Accordingly, a probability of having a BVD with a larger offset can be less than a probability of having a BVD with a smaller offset. Thus, in some examples, such as in ECM, the MBVD list reconstruction described above that uses the initial MBVD candidates such as shown in FIGS. 8-9 may not be optimal to obtain the applicable candidates in the MBVD list. For example, in both the first distance set and the second distance set, intervals between pairs of adjacent offsets can be identical (e.g., multiple intervals are 8-pel), and thus may not be optimal to obtain the applicable candidates in the MBVD list.

According to an aspect of the disclosure, intervals (or interval sizes) $\{I_1, I_2, \ldots, I_{J1}\}$ between pairs of adjacent offsets in a set of offsets $\{O_1, O_2, O_3, \ldots, O_{J1}\}$ can be different. The interval $I_i$ can be $O_i$-$O_{i-1}$. For example, $I_2=O_2-O_1$. In an example, the set of offsets $\{O_1, O_2, O_3, \ldots, O_{J1}\}$ are with respect to a position (or a reference position) having an offset 0. The interval $I_1$ can be an interval between the offsets $O_1$ and 0, such as $I_1=O_1$. J1 is a positive integer. In an example, J1 is pre-defined. The offsets (e.g., BVD offsets or MBVD offsets) in the set of offsets can be arranged in an order (e.g., an ascending order or a descending order). Each of the interval sizes is different from other interval sizes corresponding to other adjacent pairs of the set of offsets. Initial MBVD candidates can be obtained based on the set of offsets $\{O_1, O_2, O_3, \ldots, O_{J1}\}$ and the set of MBVD directions. In an example, a BVD (e.g., an MBVD) is determined from the initial MBVD candidates. In an aspect, a TM process can be used to update the initial MBVD candidates and determine the final MBVD candidates in an MBVD list (e.g., an IBC-MBVD list). The BVD or the MBVD can be selected from the final MBVD candidates. In an example, the TM process can be iteratively performed such as shown in FIG. 8.

FIG. 10 shows an example of the set of offsets (e.g., BVD offsets or MBVD offsets) $\{O_1, O_2, O_3, \ldots, O_{J1}\}$ according to an aspect of the disclosure. In FIG. 10, the set of offsets $O_1, O_2, O_3, \ldots$, On is with respect to a position (1001) (e.g., an offset of the position (1001) is 0) along a direction (1011). An MBVD candidate (1012) is determined based on the offset $O_4$ and the direction (1011) where the MBVD candidate (1012) has a magnitude of the offset $O_4$ and a direction of the direction (1011). A BVP (1021) can be indicated by the position (1001), for example, the BVP (1021) points to the position (1001). A BV candidate (1013) can be a vector sum of the BVP (1021) and the MBVD candidate (1012). The MBVD direction (1011) can represent any suitable direction, such as one of the directions shown in FIG. 7.

An interval size or an interval $I_i$ can indicate a difference between an adjacent pair (e.g., $O_{i-1}$ and $O_i$) of the BVD offsets $\{O_1, O_2, O_3, \ldots, O_{J1}\}$. The parameter i can be 1, 2, ..., or J1. The interval $I_i$ can be $O_i$-$O_{i-1}$. For example, $I_2=O_2-O_1$. $I_1$ is a difference between $O_1$ and the position (1001) that is a reference position (e.g., with an offset 0). $I_1$ can be an interval between the offsets $O_1$ and 0, such as $I_1=O_1$. FIG. 10 shows an example of the interval sizes or the intervals $\{I_1, I_2, \ldots, I_{J1}\}$. Each of the interval sizes can be different from other interval sizes corresponding to other adjacent pairs of the set of offsets, e.g., $I_i$ is different from $I_1$, $I_2, \ldots, I_{i-1}, I_{i+1} \ldots, I_{J1}$. For example, $I_1$ is different from $I_2$ to $I_{J1}$.

The interval sizes or the intervals $\{I_1, I_2, \ldots, I_{J1}\}$ can also be referred to as initial interval sizes or initial intervals, for example, because the initial interval sizes indicate the BVD offsets that are used to determine initial BVD candidates (e.g., the MBVD candidates obtained in Step 1 in FIG. 8) that are used to determine BVD candidates (e.g., MBVD candidates) in a BVD list. In an aspect, the intervals or the initial intervals $\{I_1, I_2, \ldots, I_{J1}\}$ are a starting point to construct the BVD list, for example, using template-matching.

A BVD list (e.g., an MBVD list or an IBC-MBVD list) including BVD candidates (e.g., MBVD candidates) can be determined (e.g., constructed) based at least on BVD offsets from the BVP. The BVD can be determined from the BVD candidates in the BVD list and the current block can be reconstructed using the determined BVD. According to an aspect of the disclosure, for each adjacent pair of the BVD offsets, an initial interval size indicates a difference between the adjacent pair of the BVD offsets, and each of the initial interval sizes is different from other initial interval sizes corresponding to other adjacent pairs of the BVD offsets. The different initial interval sizes can be used to construct the MBVD list with or without using template-matching.

A non-constant initial interval size (also referred to as a non-constant interval size) can be used for each interval as the start point for the MBVD list construction by using template-matching. The search step described such as in FIG. 8 can be applied on the non-constant size interval (or the non-constant interval size). The non-constant interval size can indicate that the interval sizes $\{I_1, I_2, \ldots, I_{J1}\}$ between respective pairs of adjacent offsets (or BVD offsets, MBVD offsets) can be different, such as shown in FIG. 10.

In an example, the interval sizes (or the initial interval sizes) are arranged in an ascending order. The initial interval sizes can be powers of 2. In an example, the initial interval sizes include J1 interval sizes. Each (e.g., $I_i$) of the initial interval sizes is $2^{i-1}$. i can be an integer in an range from 1 to J1. J1 is larger than 1.

In one aspect, the initial interval size is the function of power of 2. For example, the initial interval sizes, 1, 2, 4, 8, 16, 32, and 64, are used in each direction. For example, the interval sizes $I_1, I_2, I_3, I_4, I_5, I_6$, and $I_7$ are 1, 2, 4, 8, 16, 32, and 64, respectively. Referring to FIGS. 10-11, the interval sizes $I_1$, $I_2$, $I_3$, $I_4$, and $I_5$ are 1, 2, 4, 8, and 16, respectively. The position (1001) and the direction (1011) in FIG. 11 are described in FIG. 10.

In the disclosure, a high-level syntax may refer to a syntax in any of a video parameter set (VPS), an SPS, a picture parameter set (PPS), an adaptation parameter set (APS), a slice header, a picture header, a tile header, a CTU header, or the like. In an example, the high-level syntax refers to a syntax in a level that is higher than a block or a CU.

In an aspect, the initial interval sizes are stored in a look-up table. In an example, one of the initial interval sizes is not a power of 2.

In an aspect, the initial interval size for each interval is derived by using the look-up table. Each initial interval size is stored in an associated element of the look-up table and can be searched in the look-up table by using an interval index. In an example, the interval index is an MBVD index described above. This table (e.g., the look-up table) can be a predefined table or can be signaled in a high-level syntax, such as a syntax in the VPS, the SPS, the PPS, the APS, or the like described in the disclosure.

FIG. 12 shows an example of the initial interval sizes stored in a look-up table (1201) according to an aspect of the disclosure. The initial intervals $I_2$, $I_3$, $I_4$, $I_5$, $I_6$, and the like are intervals between pairs of offsets $O_1$ to $O_6$ and the like. The initial interval $I_1$ is $O_1$. The position (1001) and the direction (1011) in FIG. 12 are described in FIG. 10. Referring to FIG. 12, the initial intervals $I_1$, $I_2$, $I_3$, $I_4$, $I_5$, and $I_6$ are 1, 2, 4, 8, 16, and 17, respectively. $I_6$ that is one of the initial interval sizes is not a power of 2, e.g., 16=17. The initial intervals $I_1$, $I_2$, $I_3$, $I_4$, $I_5$, $I_6$, and the like can be stored in the look-up table (1201). An initial interval size can be searched in the look-up table (1201) by using an interval index (1202).

In an aspect, the BVD list can be determined as follows. Initial BVD candidates can be determined based on (i) the BVD offsets and (ii) BVD directions. The BVD offsets can include the set of offsets $\{O_1, O_2, O_3, \ldots, O_{J1}\}$, such as described in FIGS. 10-12. The BVD directions can include any suitable directions, such as a plurality of directions in FIG. 7. In an example, the BVD directions include the directions (721)-(724). The BVD directions can include any suitable number of directions, such as 4 directions, 8 directions, or the like. Each of the initial BVD candidates can have one of the BVD offsets and a corresponding one of the BVD directions, such as described in Step 1 in FIG. 8 and in FIG. 13.

Figure 13:
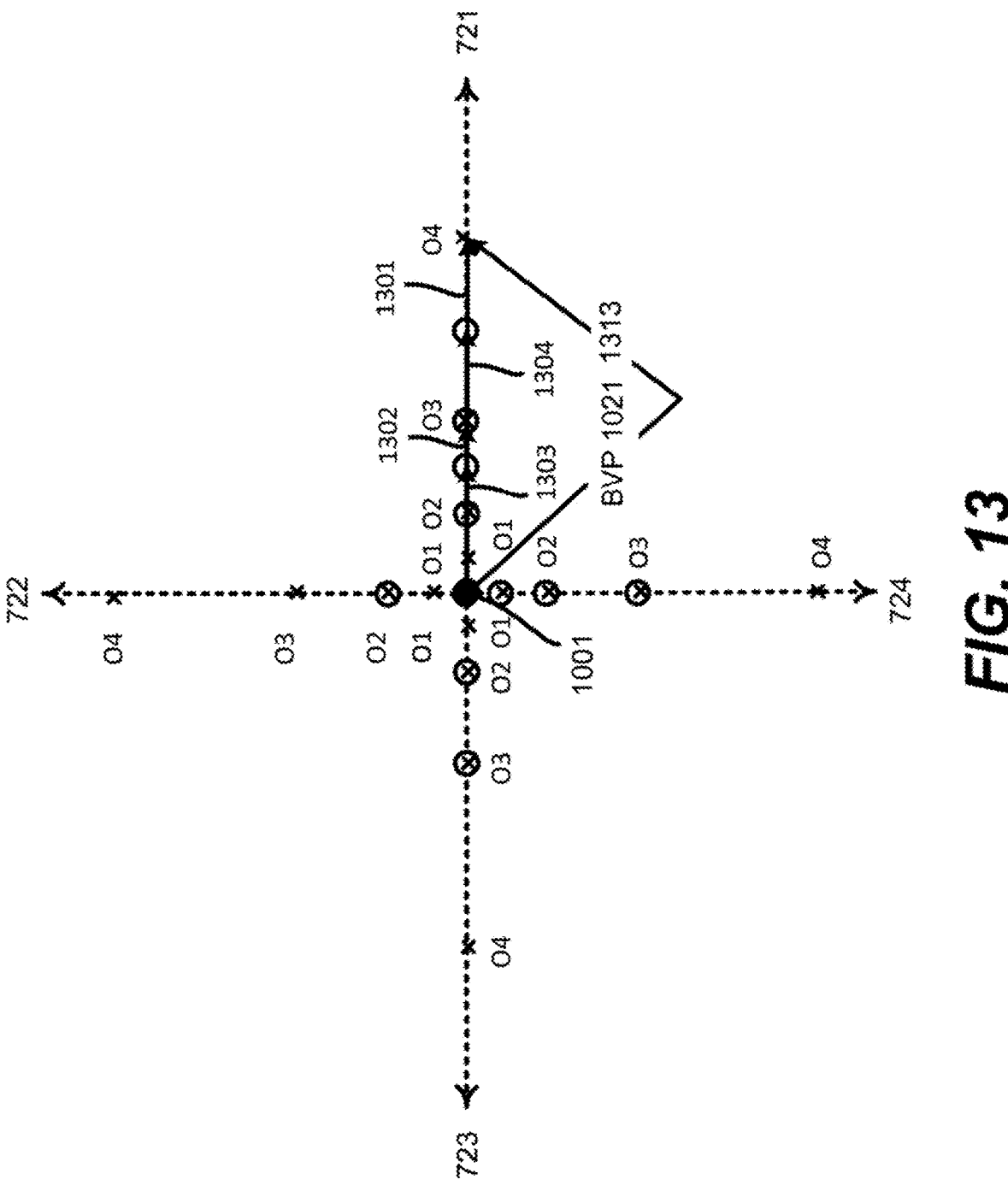
FIG. 13 shows an example of BVD offsets according to an embodiment of the disclosure.

FIG. 13 shows an example of the BVD offsets $\{O_1, O_2, O_3, \ldots, O_{J1}\}$ according to an embodiment of the disclosure. The BVD offsets can include $O_1$, $O_2$, $O_3$, $O_4$ and the like. The BVD offsets $O_1$, $O_2$, $O_3$, $O_4$ and the like can be with respect to the position (1001) as described in FIG. 10. The position (1001) can indicate the BVP (1021) as described in FIG. 10. The initial intervals $I_2$, $I_3$, $I_4$, and the like can be between adjacent offsets in the BVD offsets (e.g., $O_1$, $O_2$, $O_3$, $O_4$ and the like). The initial interval $I_1$ can be $O_1$. The initial intervals $I_1$, $I_2$, $I_3$, $I_4$, and the like can be different. In an example, each of the initial intervals $I_1$, $I_2$, $I_3$, $I_4$, and the like is different from other initial intervals. In the example in FIG. 13, the BVD directions include the directions (721)-(724). The initial BVD candidates (indicated by "x") are obtained based on the BVD offsets and the BVD directions. For example, the initial BVD candidate (1301) has a magnitude of the offset $O_4$ and a direction of the direction (721).

A TM cost associated with each initial BVD candidate in the initial BVD candidates can be determined. The TM cost can be between a current template of the current block and a respective reference template of a candidate reference block. In an example, an initial BV candidate is determined based on the BVP (1021) and the respective initial BVD candidate (e.g., the initial BV candidate (e.g., (1313)) is a sum of the BVP (1021) and the respective initial BVD candidate (e.g., (1301)), and the candidate reference block is indicated by the initial BV candidate (e.g., the initial BV candidate points from the current block to the candidate reference block). The BVD list can be determined based on the TM costs. In an example, the BVD list is determined iteratively based on the TM costs such as described in Steps 2-4 in FIG. 8.

In an example, K (e.g., 8 or any suitable positive number) initial BVD candidates (e.g., indicated by circles) are selected from the initial BVD candidates as the BVD candidates in the BVD list. The K initial BVD candidates corresponding to lowest TM costs in the TM costs, such as described in Step 2 in FIG. 8.

In an example, the K initial BVD candidates (e.g., indicated by circles) from the initial BVD candidates are selected where the K initial BVD candidates correspond to lowest TM costs in the TM costs. For each (e.g., the initial BVD candidate (1302)) of the K initial BVD candidates that has a respective BVD offset and a BVD direction, if the BVD offset (e.g., the offset $O_3$) is the only BVD offset that is larger than a first BVD offset (e.g., the offset $O_2$) and is less than a second BVD offset (e.g., the offset $O_4$) that are in the BVD offsets, a first candidate (e.g., (1303)) and a second candidate (e.g., (1304)) associated with the respective initial BVD candidate (e.g., the initial BVD candidate (1302) having the offset $O_3$) in the K initial BVD candidates are determined. The first candidate and the second candidate can have the same BVD direction (e.g., the direction (721)) as the initial BVD candidate (e.g., the initial BVD candidate (1302)), a BVD offset of the first candidate can be an average of the BVD offset (e.g., the offset $O_3$) and the first BVD offset (e.g., the offset $O_2$), and a BVD offset of the second candidate can be an average of the BVD offset (e.g., the offset $O_3$) and the second BVD offset (e.g., the offset $O_4$). New TM costs associated with the first candidate and the second candidate corresponding to each initial BVD candidate in the K initial BVD candidates can be determined, respectively. The BVD list can be determined based on updated TM costs including (i) the lowest TM costs in the TM costs corresponding to the K initial BVD candidates and (ii) the new TM costs. Updated BVD candidates in the BVD list can include K candidate(s) (corresponding to the lowest new TM costs) in the K initial BVD candidates and/or candidate(s) in the first candidates and the second candidates.

Figure 14:
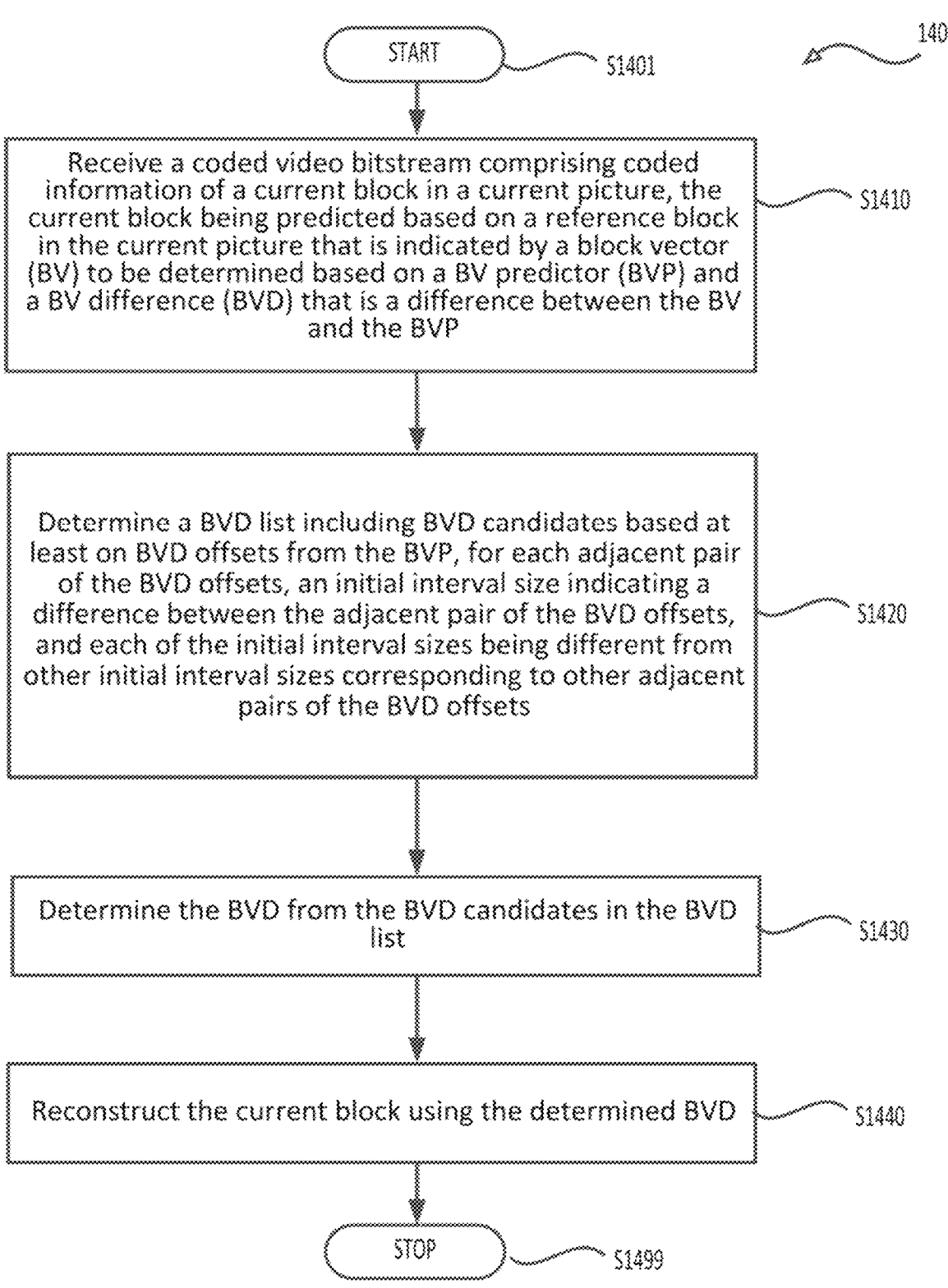
FIG. 14 shows a flow chart outlining a decoding process according to some embodiments of the disclosure.

FIG. 14 shows a flow chart outlining a process (1400) according to an embodiment of the disclosure. The process (1400) can be used in a video decoder. In various embodiments, the process (1400) is executed by processing circuitry, such as the processing circuitry that performs functions of the video decoder (110), the processing circuitry that performs functions of the video decoder (210), and the like. In some embodiments, the process (1400) is implemented in software instructions, thus when the processing circuitry executes the software instructions, the processing circuitry performs the process (1400). The process starts at (S1401) and proceeds to (S1410).

At (S1410), a coded video bitstream comprising coded information of a current block in a current picture is received. The current block can be predicted based on a reference block in the current picture that is indicated by a block vector (BV). The BV is to be determined based on a BV predictor (BVP) and a BV difference (BVD) that is a difference between the BV and the BVP. In an example, the current block is predicted using the IBC mode. In an example, the current block is predicted using the IntraTMP mode.

At (S1420), a BVD list including BVD candidates can be determined based at least on BVD offsets from the BVP, such as described in FIG. 13.

In an aspect, for each adjacent pair of the BVD offsets, an initial interval size indicates a difference between the adjacent pair of the BVD offsets, and each of the initial interval sizes is different from other initial interval sizes corresponding to other adjacent pairs of the BVD offsets. FIGS. 10-12 describe examples of the BVD offsets.

In an example, the initial interval sizes are arranged in an ascending order.

In an example, the initial interval sizes are powers of 2, such as shown in FIG. 11. In an example, the initial interval sizes include J1 sizes, each of the initial interval sizes is $2^{i-1}$, i is an integer in an range from 1 to J1, and J1 is larger than 1.

In an example, the initial interval sizes are stored in a look-up table, such as shown in FIG. 12.

In an example, one of the initial interval sizes is not a power of 2, such as shown in FIG. 12.

In an example, initial BVD candidates are determined based on (i) the BVD offsets and (ii) BVD directions. Each of the initial BVD candidates can have one of the BVD offsets and a corresponding one of the BVD directions, such as shown in FIG. 13. A TM cost associated with each initial BVD candidate in the initial BVD candidates between a current template of the current block and a respective reference template of a candidate reference block can be determined. The candidate reference block can be indicated by an initial BV candidate that is a sum of the BVP and the respective initial BVD candidate. The BVD list can be determined based on the TM costs.

In an example, K initial BVD candidates from the initial BVD candidates are selected as the BVD candidates in the BVD list. The K initial BVD candidates correspond to lowest TM costs in the TM costs.

In an example, K initial BVD candidates are selected from the initial BVD candidates. The K initial BVD candidates correspond to lowest TM costs in the TM costs. For each of the K initial BVD candidates that has a respective BVD offset and a BVD direction, when the BVD offset is the only BVD offset that is larger than a first BVD offset and is less than a second BVD offset that are in the BVD offsets, a first candidate and a second candidate associated with the respective initial BVD candidate in the K initial BVD candidates can be determined, such as described in FIG. 13. The first candidate and the second candidate have the same BVD direction as the initial BVD candidate. A BVD offset of the first candidate is an average of the BVD offset and the first BVD offset, and a BVD offset of the second candidate is an average of the BVD offset and the second BVD offset. New TM costs associated with the first candidate and the second candidate, respectively can be determined. The BVD list can be determined based on updated TM costs including (i) the lowest TM costs in the TM costs corresponding to the K initial BVD candidates and (ii) the new TM costs.

At (S1430), the BVD can be determined from the BVD candidates in the BVD list.

At (S1440), the current block can be reconstructed using the determined BVD.

In an example, the BVP is determined. The BV is determined as a sum of the BVP and the determined BVD. The current block can be reconstructed using the determined BV.

Then, the process proceeds to (S1499) and terminates.

The process (1400) can be suitably adapted. Step(s) in the process (1400) can be modified and/or omitted. Additional step(s) can be added. Any suitable order of implementation can be used.

FIG. 15 shows a flow chart outlining a process (1500) according to an embodiment of the disclosure. The process (1500) can be used in a video encoder. In various embodiments, the process (1500) is executed by processing circuitry, such as the processing circuitry that performs functions of the video encoder (103), the processing circuitry that performs functions of the video encoder (303), and the like. In some embodiments, the process (1500) is implemented in software instructions, thus when the processing circuitry executes the software instructions, the processing circuitry performs the process (1500). The process starts at (S1501) and proceeds to (S1510).

At (S1510), a block vector (BV) difference (BVD) list including BVD candidates can be determined based at least on BVD offsets from a BV predictor (BVP) of a current block in a current picture, such as described in (S1420) of FIG. 14. The current block can be coded based on a reference block in the current picture that is indicated by a BV to be determined based on the BVP and a BVD. The current block can be coded using the IBC mode or the IntraTMP mode.

For each adjacent pair of the BVD offsets, an initial interval size indicates a difference between the adjacent pair of the BVD offsets. Each of the initial interval sizes can be different from other initial interval sizes corresponding to other adjacent pairs of the BVD offsets, such as described in FIGS. 10-12.

At (S1520), the BVD can be determined from the BVD candidates in the BVD list.

At (S1530), the current block can be encoded using the determined BVD.

Then, the process proceeds to (S1599) and terminates.

The process (1500) can be suitably adapted. Step(s) in the process (1500) can be modified and/or omitted. Additional step(s) can be added. Any suitable order of implementation can be used.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
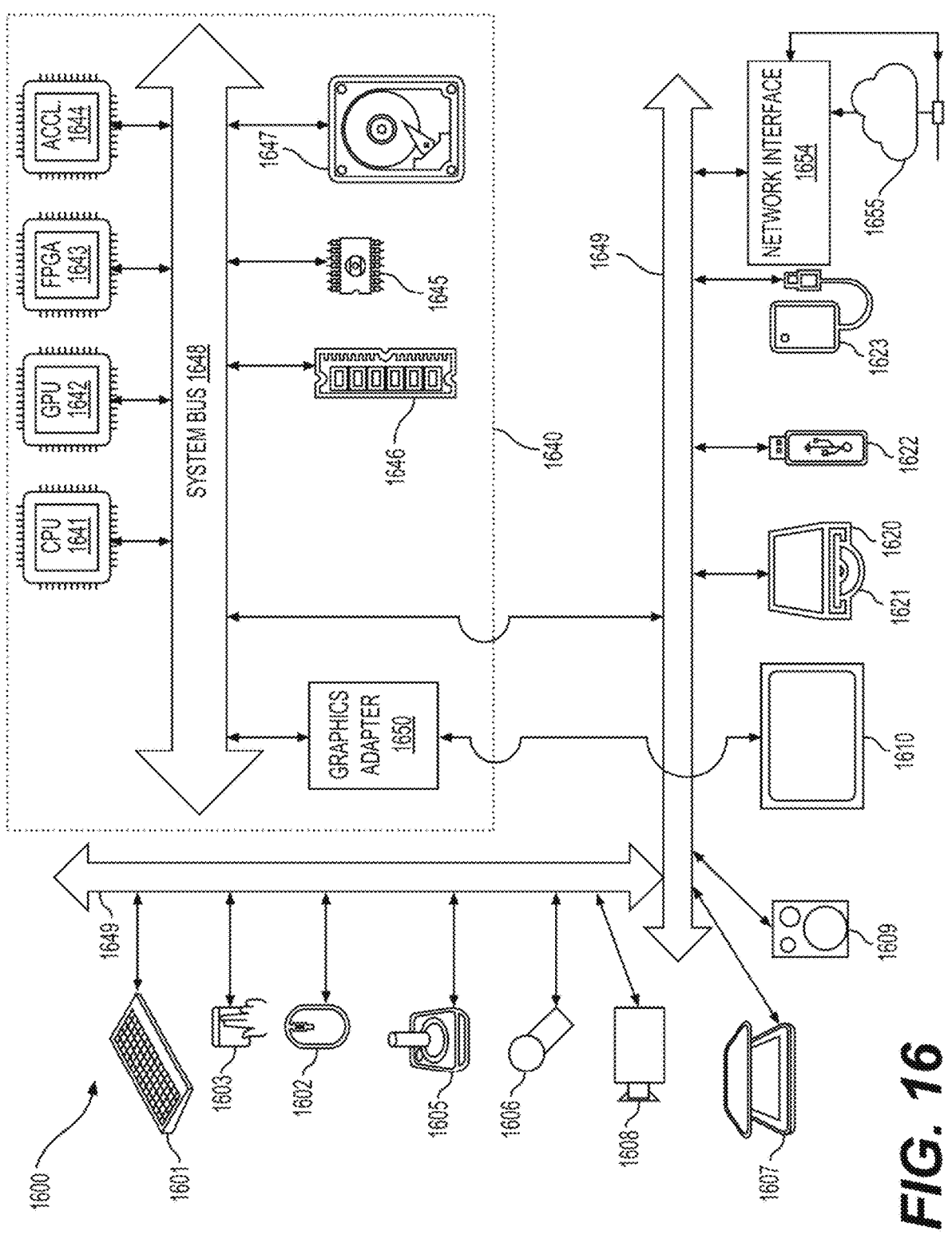
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hard-wired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving a coded video bitstream comprising coded information of a current block in a current picture, the current block being predicted based on a reference block in the current picture that is indicated by a block vector (BV) to be determined based on a BV predictor (BVP) and a BV difference (BVD) that is a difference between the BV and the BVP;
determining initial BVD candidates based on (i) BVD offsets and (ii) BVD directions, each of the initial BVD candidates having (i) one of the BVD offsets that indicates a magnitude of the respective initial BVD candidate and (ii) a corresponding one of the BVD directions;
determining a template-matching (TM) cost associated with each initial BVD candidate in the initial BVD candidates; and
determining a BVD list including BVD candidates based on the TM costs;
determining the BVD from the BVD candidates in the BVD list; and
reconstructing the current block using the determined BVD, wherein
for each adjacent pair of the BVD offsets,
an initial interval size indicates a difference between the adjacent pair of the BVD offsets, and
each of the initial interval sizes is different from other initial interval sizes corresponding to other adjacent pairs of the BVD offsets.

2. The method of claim 1, wherein the initial interval sizes are arranged in an ascending order.

3. The method of claim 1, wherein the initial interval sizes are powers of 2.

4. The method of claim 3, wherein the initial interval sizes include J1 sizes, each of the initial interval sizes is 21-1, i is an integer in an range from 1 to J1, and J1 is larger than 1.

5. The method of claim 1, wherein the initial interval sizes are stored in a look-up table.

6. The method of claim 5, wherein one of the initial interval sizes is not a power of 2.

7. The method of claim 1, wherein the determining the TM cost comprises:
determining the TM cost associated with each initial BVD candidate in the initial BVD candidates between a current template of the current block and a respective reference template of a candidate reference block, the candidate reference block being indicated by an initial BV candidate that is a sum of the BVP and the respective initial BVD candidate.

8. The method of claim 1, wherein the determining the BVD list based on the TM costs comprises:
selecting K initial BVD candidates from the initial BVD candidates as the BVD candidates in the BVD list, the K initial BVD candidates corresponding to lowest TM costs in the TM costs.

9. The method of claim 1, wherein the determining the BVD list based on the TM costs comprises:
selecting K initial BVD candidates from the initial BVD candidates, the K initial BVD candidates corresponding to lowest TM costs in the TM costs;
for each of the K initial BVD candidates that has a respective BVD offset and a BVD direction,
when the BVD offset is the only BVD offset that is larger than a first BVD offset and is less than a second BVD offset that are in the BVD offsets, determining a first candidate and a second candidate associated with the respective initial BVD candidate in the K initial BVD candidates, the first candidate and the second candidate having the same BVD direction as the initial BVD candidate, a BVD offset of the first candidate being an average of the BVD offset and the first BVD offset, and a BVD offset of the second candidate being an average of the BVD offset and the second BVD offset;
determining new TM costs associated with the first candidate and the second candidate, respectively; and
determining the BVD list based on updated TM costs including (i) the lowest TM costs in the TM costs corresponding to the K initial BVD candidates and (ii) the new TM costs.

10. The method of claim 1, wherein
the method further includes determining the BVP; and
the reconstructing includes:
determining the BV as a sum of the BVP and the determined BVD; and
reconstructing the current block using the determined BV.

11. A method of video encoding, comprising:
determining initial block vector difference (BVD) candidates based on (i) BVD offsets and (ii) BVD directions, each of the initial BVD candidates having (i) one of the BVD offsets that indicates a magnitude of the respective initial BVD candidate and (ii) a corresponding one of the BVD directions;
determining a template-matching (TM) cost associated with each initial BVD candidate in the initial BVD candidates; and determining, based on the TM costs, a block vector difference (BVD) list including BVD candidates for a current block in a current picture, the current block being predicted based on a reference block in the current picture that is indicated by a block vector (BV) to be determined based on a BV predictor (BVP) and a BVD that is a difference between the BV and the BVP;

determining the BVD from the BVD candidates in the BVD list; and encoding the current block using the determined BVD, wherein for each adjacent pair of the BVD offsets, an initial interval size indicates a difference between the adjacent pair of the BVD offsets, and each of the initial interval sizes is different from other initial interval sizes corresponding to other adjacent pairs of the BVD offsets.

12. The method of claim 11, wherein the initial interval sizes are arranged in an ascending order.

13. The method of claim 11, wherein the initial interval sizes are powers of 2.

14. The method of claim 13, wherein the initial interval sizes include J1 sizes, each of the initial interval sizes is $2^{i-1}$, i is an integer in an range from 1 to J1, and J1 is larger than 1.

15. The method of claim 11, wherein the initial interval sizes are stored in a look-up table.

16. The method of claim 15, wherein one of the initial interval sizes is not a power of 2.

17. The method of claim 11, wherein the determining the TM cost comprises:

determining the TM cost associated with each initial BVD candidate in the initial BVD candidates between a current template of the current block and a respective reference template of a candidate reference block, the candidate reference block being indicated by an initial BV candidate that is a sum of the BVP and the respective initial BVD candidate.

18. The method of claim 11, wherein the determining, based on the TM costs, the BVD list comprises:

selecting K initial BVD candidates from the initial BVD candidates as the BVD candidates in the BVD list, the K initial BVD candidates corresponding to lowest TM costs in the TM costs.

19. The method of claim 11, wherein the determining, based on the TM costs, the BVD list comprises:

selecting K initial BVD candidates from the initial BVD candidates, the K initial BVD candidates corresponding to lowest TM costs in the TM costs;

for each of the K initial BVD candidates that has a respective BVD offset and a BVD direction, when the BVD offset is the only BVD offset that is larger than a first BVD offset and is less than a second BVD offset that are in the BVD offsets, determining a first candidate and a second candidate associated with the respective initial BVD candidate in the K initial BVD candidates, the first candidate and the second candidate having the same BVD direction as the initial BVD candidate, a BVD offset of the first candidate being an average of the BVD offset and the first BVD offset, and a BVD offset of the second candidate being an average of the BVD offset and the second BVD offset;

determining new TM costs associated with the first candidate and the second candidate, respectively; and determining the BVD list based on updated TM costs including (i) the lowest TM costs in the TM costs corresponding to the K initial BVD candidates and (ii) the new TM costs.

20. A non-transitory computer-readable storage medium storing instructions which when executed by a processor cause the processor to perform an encoding method comprising:

determining initial block vector difference (BVD) candidates based on (i) BVD offsets and (ii) BVD directions, each of the initial BVD candidates having (i) one of the BVD offsets that indicates a magnitude of the respective initial BVD candidate and (ii) a corresponding one of the BVD directions;

determining a template-matching (TM) cost associated with each initial BVD candidate in the initial BVD candidates; and determining, based on the TM costs, a block vector difference (BVD) list including BVD candidates for a current block in a current picture, the current block being predicted based on a reference block in the current picture that is indicated by a block vector (BV) to be determined based on a BV predictor (BVP) and a BVD that is a difference between the BV and the BVP;

determining the BVD from the BVD candidates in the BVD list;

encoding, in a bitstream, the current block using the determined BVD; and transmitting the bitstream, wherein for each adjacent pair of the BVD offsets, an initial interval size indicates a difference between the adjacent pair of the BVD offsets, and each of the initial interval sizes is different from other initial interval sizes corresponding to other adjacent pairs of the BVD offsets.

* * * * *